United States Patent
Kleb et al.

(10) Patent No.: US 6,786,500 B2
(45) Date of Patent: Sep. 7, 2004

(54) TRAILER COUPLING

(75) Inventors: Emmerich Kleb, Markgroeningen (DE); Hans Riehle, Ludwigsburg (DE); Michael Fischer, Asperg (DE); Martin Dreher, Moeglingen (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 109 days.

(21) Appl. No.: 10/233,323

(22) Filed: Aug. 29, 2002

(65) Prior Publication Data

US 2003/0075900 A1 Apr. 24, 2003

(30) Foreign Application Priority Data

Sep. 3, 2001 (DE) .......................................... 101 44 254

(51) Int. Cl.⁷ ................................................. B60D 1/01
(52) U.S. Cl. .................................................... 280/491.1
(58) Field of Search ................................ 280/468–470, 280/491.1, 491.3, 478.1, 479.1, 511

(56) References Cited

U.S. PATENT DOCUMENTS

| | | | | |
|---|---|---|---|---|
| 4,923,205 A | * | 5/1990 | Durm | 280/491.3 |
| 5,000,474 A | * | 3/1991 | Kristensen | 280/491.5 |
| 5,242,186 A | * | 9/1993 | Pettersson | 280/511 |
| 5,853,186 A | * | 12/1998 | Gentner et al. | 280/491.3 |
| 5,964,475 A | | 10/1999 | Gentner et al. | |
| 6,000,709 A | | 12/1999 | Gentner et al. | |
| 6,402,178 B1 | * | 6/2002 | Ifflaender | 280/491.3 |
| 6,409,201 B1 | | 6/2002 | Riehle | |
| 2002/0020988 A1 | | 2/2002 | Kleb et al. | |

FOREIGN PATENT DOCUMENTS

| | | |
|---|---|---|
| DE | 196 12 961 | 10/1997 |
| DE | 196 12 962 | 10/1997 |
| DE | 198 48 487 | 5/2000 |
| DE | 198 58 978 | 6/2000 |
| DE | 198 59 961 | 7/2000 |
| DE | 199 02 355 | 8/2000 |
| DE | 100 17 013 | 10/2001 |
| EP | 1 024 036 | 8/2000 |
| EP | 1 142 732 | 10/2001 |
| EP | 1 160 104 | 12/2001 |

* cited by examiner

Primary Examiner—Lesley D. Morris
Assistant Examiner—Paul Royal, Jr.
(74) Attorney, Agent, or Firm—Barry R. Lipsitz; Douglas M. McAllister

(57) ABSTRACT

In order to achieve as reliable a safety functioning as possible with as simple a construction as possible in the case of a trailer coupling for motor vehicles, comprising a bearing part arranged so as to be fixed on the vehicle, a ball neck which can be moved in relation to the bearing part between an operative position and a rest position and is mounted so as to be rotatable, a ball neck fixing means with form locking elements which can be transferred by way of relative movement from a fixing position into a release position and vice versa, and a mechanical positioning device, with which the relative movement of the form locking elements can be brought about for reaching the fixing position and the release position, it is suggested that form locking elements be arranged on the bearing part and form locking elements be arranged on the bearing head, that the bearing head be movable relative to the bearing part in a direction transverse to a pivoting direction in order to move the form locking elements between the fixing position and the release position, that the positioning device be adapted to be brought into a fixing position and be adapted to be brought into a release position, and that the positioning device have a force storing means which generates in the release position a restoring force which acts in the direction of a transfer into the fixing position.

80 Claims, 18 Drawing Sheets

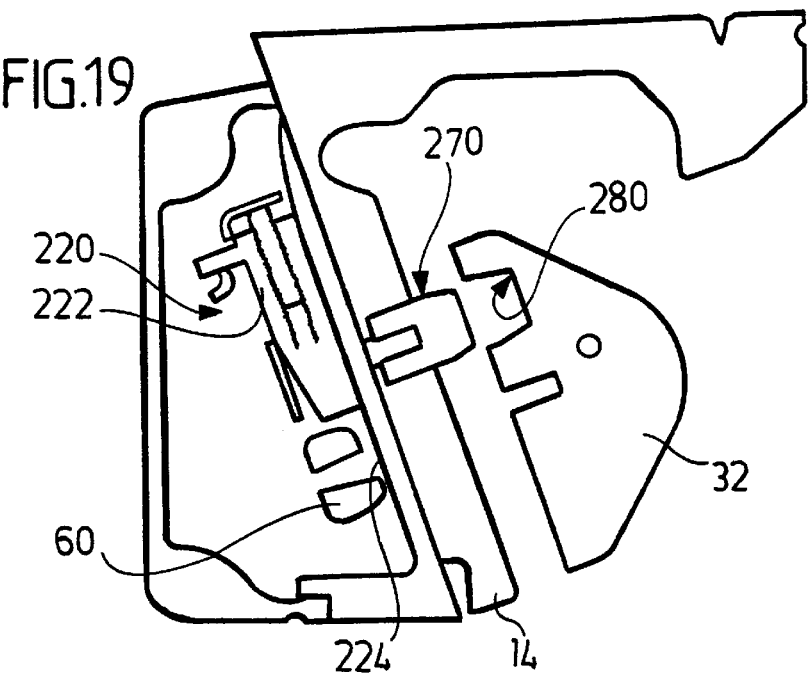
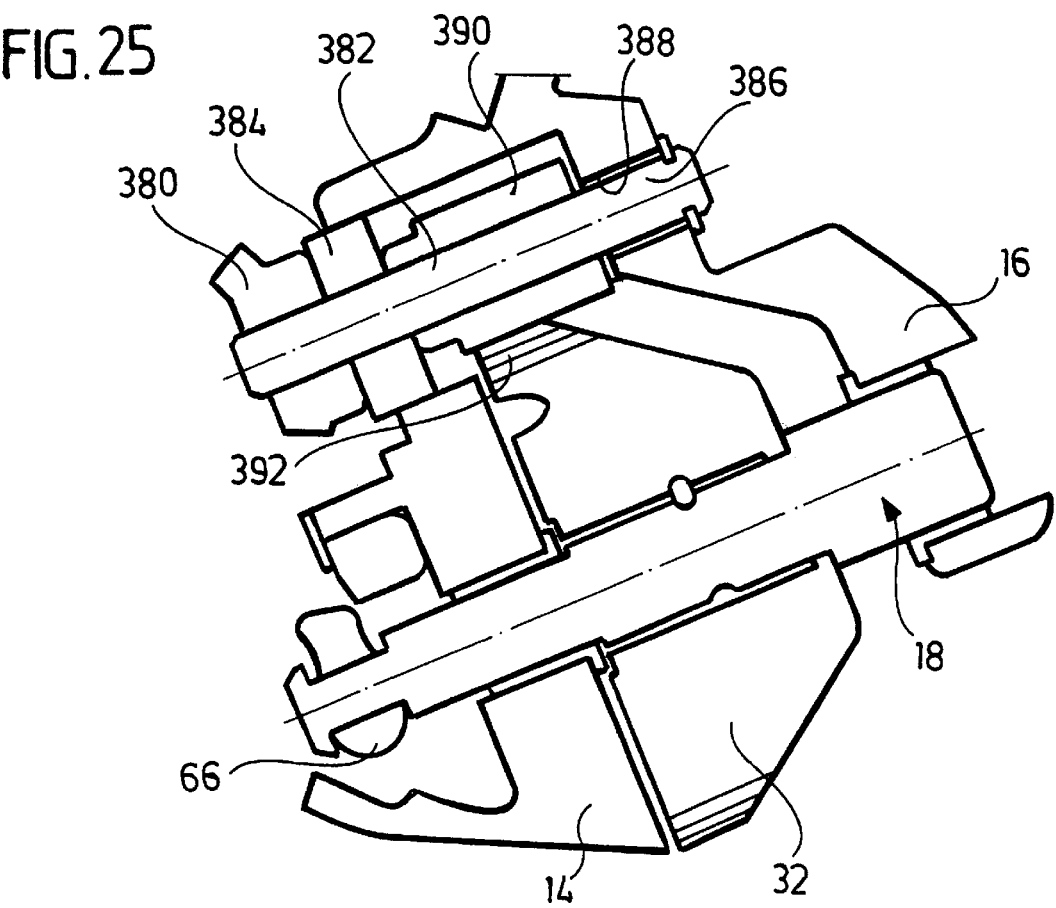

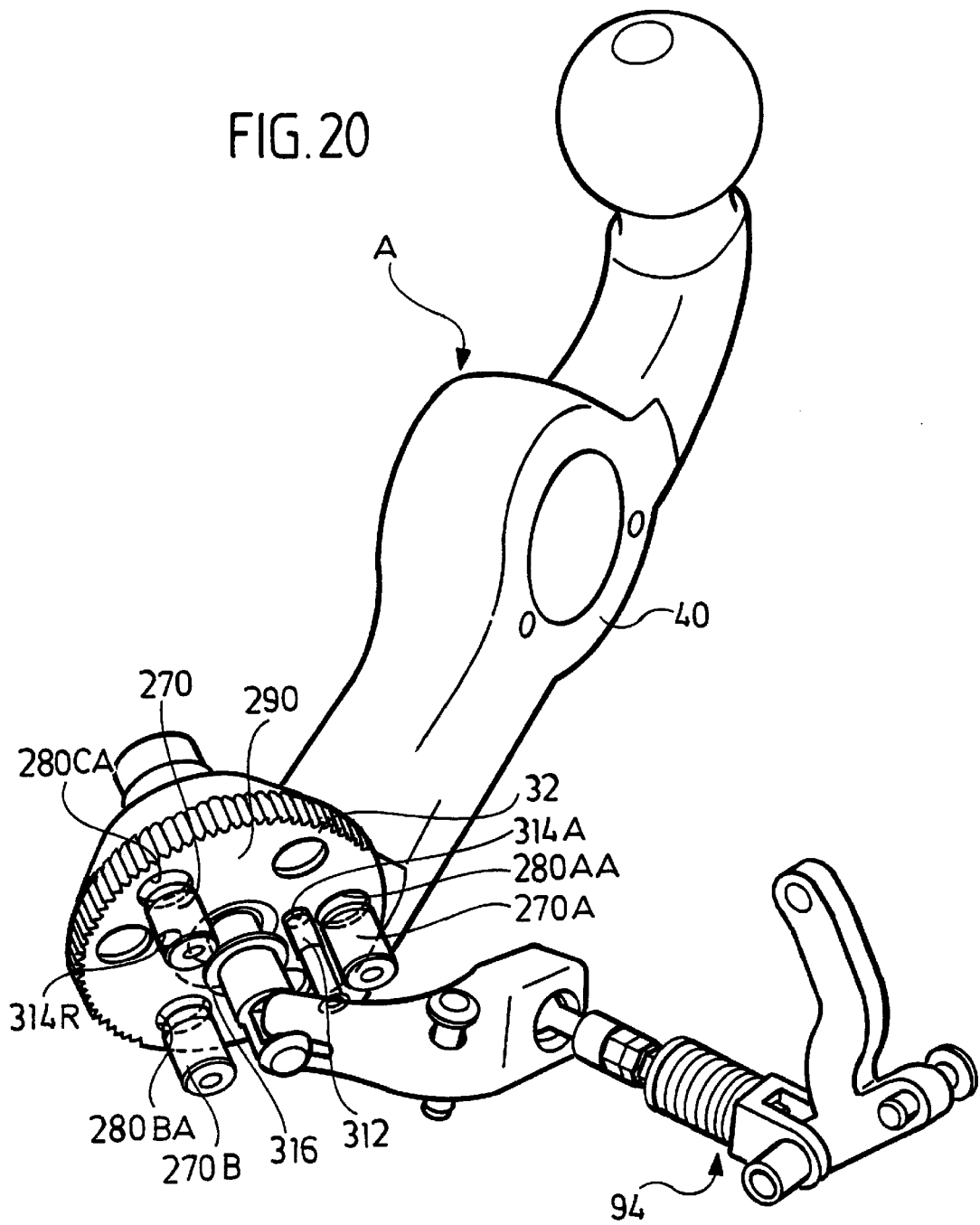

TRAILER COUPLING

The invention relates to a trailer coupling for motor vehicles, comprising a bearing part arranged so as to be fixed on the vehicle, a ball neck which can be moved in relation to the bearing part between an operative position and a rest position and which is mounted on the bearing part by means of a bearing head so as to be at least rotatable, a ball neck fixing means with form locking elements which can be transferred due to relative movement from a fixing position, in which the bearing head is secured relative to the bearing part in a form locking manner, into a release position, in which the bearing head can be moved in relation to the bearing part, and vice versa and a mechanical positioning device, with which the relative movement of the form locking elements can be brought about in order to reach the fixing position and the release position.

The solutions known thus far are either mechanically complicated or not the best in all the possible operating states with respect to being able to achieve a secure locking.

The object underlying the invention is, therefore, to achieve as reliable a safety functioning as possible with a simple mechanical construction, in particular, of the ball neck fixing means.

This object is accomplished in accordance with the invention, in a trailer coupling of the type described at the outset, in that form locking elements are arranged on the bearing part and form locking elements are arranged on the bearing head, that the bearing head can be moved relative to the bearing part in a direction transverse to a pivoting direction in order to move the form locking elements between the fixing position and the release position, that the positioning device can be brought into a fixing position, in which it positions the bearing head in such a manner that the form locking elements are in the fixing position, and can be brought into a release position, in which it positions the bearing head in such a manner that the form locking elements are in the release position, that the positioning device can be brought from the fixing position into the release position by means of an actuation and that the positioning device has a force storing means which generates in the release position a restoring force which acts in the non-actuated state of the positioning device in the direction of a transfer into the fixing position so that the positioning device transfers the form locking elements in the operative position and the rest position automatically from the release position into the fixing position.

The advantage of the inventive solution is to be seen in the fact that due to the displacement of the bearing head a simple possibility exists of moving the form locking elements back and forth between the release position and the fixing position and that, on the other hand, it is possible via the positioning device with the force storing means for the positioning device to transfer the form locking elements automatically from the release position into the fixing position so that the trailer coupling, in the operative position and in the rest position, always transfers automatically from the release position into the fixing position.

In principle, it would be conceivable to allow the restoring force of the force storing means to be constantly active.

One particularly advantageous solution provides, however, for the restoring force of the force storing means to be activatable due to transfer of the positioning device from the fixing position into the release position.

In principle, it would be possible to realize the interaction between the positioning device and the bearing head in such a manner that the positioning device acts on the bearing head merely in the direction of the fixing position and releases it for the transfer into the release position.

For reasons of as reliable a functioning as possible with as little error susceptibility as possible it is, however, advantageous when the positioning device moves the bearing head back and forth between the fixing position and the release position in an automatically controlled manner.

In order for the positioning device not to leave the fixing position when this has been reached, it is preferably provided for the positioning device to have a mechanism which automatically maintains a stable position in the fixing position. As a result of a positioning device of such a design, it is possible to reach the fixing position reliably, on the one hand, and, on the other hand, to prevent the positioning device from leaving the fixing position again.

In this respect, it is even better when the mechanism is self locking in the fixing position against any movement in the direction of the release position so that an even greater functional reliability is ensured.

With respect to the design of the mechanism, the most varied of solutions are conceivable.

It would, for example, be conceivable to design the mechanism as a wheel gear.

A particularly simple solution from a constructional point of view provides, however, for the mechanism to be a lever mechanism.

With respect to the design of the force storing means, no further details have been given in conjunction with the preceding explanations concerning the individual embodiments.

It would, for example, be conceivable to design the force storing means as an electrically acting force storing means, for example, as a magnet or also as a pneumatic force storing means.

A particularly robust and simple solution does, however, provide for the force storing means to be a mechanical force storing means.

The force storing means may be realized in a particularly simple manner from a constructional point of view as a spring force storing means.

With respect to the design of the force storing means in conjunction with the fixing position and the release position, the most varied of possibilities are conceivable.

It would, for example, be conceivable to use the force storing means such that this does not generate any more force in the fixing position.

It is, however, particularly favorable when the force storing means is in a first tensioned state in the fixing position and in a second tensioned state in the release position so that the force storing means is still effective with a force even in the fixing position.

Such a force is of advantage in many cases. For example, it is of advantage so that it can be ensured that the positioning device transfers into the fixing position with the greatest possible functional reliability and does not not reach the fixing position on account of mechanical restraints.

In this respect, it is particularly advantageous when the mechanism, in the non-actuated state of the positioning device, transfers automatically into the stable position due to the action of the force storing means so that the tensioned state of the force storing means in the fixing position can be utilized to maintain the stable position of the mechanism.

With respect to the design of the mechanism, the most varied of possibilities are conceivable. For example, the mechanism could act completely independently of the force storing means and serve merely to achieve the stable position and, where applicable, the self-locking.

It is even more advantageous when the mechanism is a force transfer mechanism for the force storing means so that the force storing means is integrated into the mechanism which thus also serves at the same time to transfer the forces of the force storing means in addition to achieving the stable position.

In order to obtain as advantageous an effect as possible of the forces of the force storing means, it is preferably provided for the force transfer mechanism to be designed as a force transmission mechanism and thus not to transfer the force generated by the force storing means in the same ratio but rather to effect a force amplification at least in some of the possible positions.

A particularly favorable type of force transmission provides for the force transmission mechanism to amplify the force generated in the respective position by the force storing means to a lesser extent in the release position than in the fixing position.

In order to have as large a force as possible available for reaching the fixing position, it is preferably provided for the force transmission mechanism to have the greatest amplification for the force of the force storing means in its positions located close to the fixing position.

The force transfer mechanism may be designed in the most varied of ways.

For example, it would be conceivable to design the force transfer mechanism as a gear.

A particularly favorable solution provides for the force transfer mechanism to be an elbow lever mechanism.

In order to have, on the one hand, forces which are as large as possible available in the fixing position and, on the other hand, to achieve as stable a position as possible, it is preferably provided for the elbow lever mechanism to be designed such that it is close to its dead-center position in the fixing position.

With respect to the action of the positioning device in the fixing position, no further details have so far been given.

In principle, it would be conceivable to design the positioning device such that it positions the form locking elements and the bearing head in the fixing position so as to be free from any force acting on them.

One particularly favorable solution does, however, provide for the positioning device to have a tensioning position as fixing position, in which the positioning device generates a force which contributes to a tensioning force acting on the bearing head.

Such a tensioning force may preferably be used in order to position the bearing head in the fixing position free from play and, therefore, to improve the functional reliability of the trailer coupling, in particular, with respect to the permanent load stability of the trailer coupling.

Such a force may be generated in the positioning device, for example, by means of the force storing means already present.

It is, however, particularly advantageous when the positioning device comprises a tensioning force storing means which generates the force contributing to the tensioning force.

Such a tensioning force storing means is preferably independent of the force storing means for the restoring force so that the stable position of the positioning device can be reached with the restoring force and then the force contributing to the tensioning force can be generated by the tensioning force storing means.

Such a tensioning force storing means is preferably designed as a mechanical tensioning force storing means, in particular, as a spring force storing means.

A particularly advantageous solution provides for the tensioning force storing means to be activatable during the transfer of the positioning device into the tensioning position so that the tensioning force storing means need not constantly be activated but rather is active only in positions close to the tensioning position.

A particularly favorable solution provides for the tensioning force storing means to be active between the tensioning position and a blocking position of the positioning device.

Furthermore, it is favorable when the tensioning force storing means is inactive between the blocking position and the release position.

A particularly advantageous solution provides for the tensioning force storing means to be activatable by the transfer from the blocking position into the tensioning position.

A particularly simple form of the activation of the tensioning force storing means provides for the tensioning force storing means to be activatable by the force storing means. Such an activation may be brought about, in particular, due to the fact that the force storing means transfers the positioning device into the tensioning position and during this transfer activates the tensioning force storing means at the same time.

A particularly advantageous solution from a constructional point of view provides for the tensioning force storing means to be integrated into the mechanism of the positioning device.

This may be realized particularly favorably when the tensioning force storing means is integrated into the force transmission mechanism. In the most advantageous case, the tensioning force storing means is integrated into a lever of the force transmission mechanism designed as a lever mechanism.

In conjunction with the preceding description of the individual embodiments of the inventive solution, no details have been given as to how the positioning device is intended to be actuatable.

For example, it would be conceivable to carry out a direct actuation of the positioning device.

A particularly favorable solution provides, however, for the positioning device to be actuatable by a triggering device, with which primarily a triggering of the positioning device can be achieved with transfer thereof from the fixing position into the release position.

In this respect, it is particularly favorable when the mechanism of the positioning device can be moved into the release position with the triggering device contrary to the action of the force storing means so that the triggering device creates a suitable possibility for transferring the positioning device from the fixing position or tensioning position into the release position.

In order to facilitate the transfer of the positioning device into the release position, it is preferably provided for the triggering device to act with a force amplifying gear on the positioning device so that, as a result, the forces acting in the positioning device, in particular, the force of the force storing means can be overcome more easily.

A particularly favorable solution provides for the triggering device to act on the positioning device with a cam gear.

Furthermore, it is preferably provided for the self locking of the positioning device to be terminated with the triggering device so that the triggering device serves an additional purpose.

In order to provide additional safety, it is preferably provided for the positioning device to be securable in the fixing position or tensioning position with the triggering device so that the triggering device can serve not only for the transfer from the fixing position into the release position but, at the same time, undertakes an additional securing function for the positioning device.

With respect to the actuation of the triggering device, the most varied of possibilities are conceivable. One advantageous solution, for example, provides for the triggering device to be actuatable manually.

In order to decouple such a manual actuation of the triggering device from the elements interacting directly with the positioning device, it is preferably provided for the triggering device to be actuatable manually via a free-moving element acting on an adjusting element.

Such an adjusting element of the triggering device serves the purpose of actuating the positioning device while the free-moving element can be moved in a free-moving manner in relation to the adjusting element so that, for example, the free-moving element can return to its initial position after actuation while the adjusting element remains in accordance with the position of the positioning device and, for example, does not return again to the initial position until the positioning device transfers into the fixing position or tensioning position.

Alternatively or in addition to the manual actuation of the triggering device, a particularly advantageous embodiment provides for the triggering device to be actuatable via an electric triggering drive.

Such an electrically driven triggering drive has the advantage that with it the operation of the inventive trailer coupling, in particular, the triggering can be designed in an operatively friendly manner and, in particular, it is also possible to integrate electrically monitored safety functions, in addition.

The electric triggering drive may be realized in the most varied of way.

For example, it would be conceivable to realize the electric triggering drive by means of an electrically operable triggering magnet drive.

A particularly efficient solution saving, in particular, on current provides for the electric triggering drive to comprise a drive motor and an electrically controllable coupling.

In this respect, the use of an electric drive motor with a reduction gear is particularly advantageous since, as a result, adequately large forces can be generated with low electrical force and, in addition, the controllable coupling creates the possibility of decoupling the drive motor again.

The electrically controllable coupling can be controllable in the most varied of ways.

For example, it would be conceivable to use a coupling which can be switched back and forth by means of electrical actuation between a released and an engaged state.

A particularly favorable solution provides, however, for the electrically controllable coupling to be designed as a coupling released in the state without current. This design of the coupling has the great advantage that the coupling is always released during a power outage and, therefore, a connection between the drive motor and the triggering device is interrupted so that the triggering device always transfers into the non-actuated state during a power outage and, therefore, the trailer coupling can always transfer automatically into its secure position in an inventive manner.

This solution is a great advantage with respect to the functional reliability of the inventive trailer coupling since, as a result, it is ensured even during a power outage that the trailer coupling transfers automatically into its secured state, i.e., into its fixing position or tensioning position without additional measures being required.

With respect to the actuation of the triggering device, the most varied of possibilities are conceivable. For example, it would be conceivable to release the coupling when the triggering device or the positioning device has reached a certain position, wherein this position can, for example, be detected by a sensor.

A particularly reliable solution provides, however, for the electric triggering device to have a triggering control which closes the electrically controllable coupling during a predetermined triggering period following a starting signal and subsequently releases it.

This focusing of the activation of the electrically controllable coupling on a predetermined triggering period signifies an additional, advantageous feature which is relevant with respect to safety since, as a result, a release of the coupling always takes place irrespective of the functioning of the triggering device and the positioning device and, therefore, it is ensured that even when the positioning device or the triggering device does not function in the prescribed manner and, therefore, the position to be detected by the sensor also cannot be reached, for example, the actuation of the triggering device is terminated in any case due to the release of the coupling following the predetermined triggering period.

In this respect, the drive motor of the electric triggering drive is preferably activated in accordance with the coupling during the triggering period.

With respect to the type of action of the positioning device on the bearing head, no further details have so far been given. It would, for example, be conceivable for the positioning device to act directly on the bearing head.

A particularly favorable solution provides for the positioning device to act on the bearing head via a coupling device. Such a coupling device allows mechanical action on the bearing head in a particularly advantageous manner.

With respect to the design of the coupling device, the most varied of possibilities are thereby conceivable.

One advantageous type of design for the coupling device provides for this to comprise a movable bearing pin, on which the bearing head is rotatably mounted and via which the bearing head can be moved from the fixing position into the release position and vice versa. In this respect, the bearing pin could be movable relative to the bearing part transversely or at an angle to its axial direction. It is, however, preferably movable relative to the bearing part in its axial direction.

The provision of a bearing pin for the mounting of the bearing head and, at the same time, for the movement of the bearing head is particularly advantageous from a constructional point of view since the forces required for the positioning of the bearing head may be applied to it in a particularly simple manner via this bearing pin and, in particular, forces acting asymmetrically on the bearing head can be avoided.

In this respect, it is particularly advantageous when the bearing head is movable by means of the movable bearing pin in the direction of a first bearing side wall of the bearing part which bears the form locking elements arranged on the bearing part.

As a result, it is possible in a simple manner to bring the form locking elements into engagement with one another via the bearing pin.

Furthermore, it is favorable when the bearing pin is mounted in the first bearing side wall and in a second bearing side wall of the bearing part arranged at a distance from it and when the bearing head of the bearing neck is arranged between the bearing side walls.

With respect to the location of the action on the bearing pin, no further details have so far been given.

One particularly favorable embodiment provides for the bearing pin to be acted upon from a side of a bearing side wall of the bearing part facing away from the bearing head.

It is particularly favorable when the action on the bearing pin is brought about from the side of the bearing side wall bearing the form locking elements arranged on the bearing part which faces away from the bearing head.

A particularly advantageous solution provides for the coupling device to comprise a reversing lever which is coupled to the bearing pin so that a simple actuation of the bearing pin can be realized via this reversing lever.

In this respect, it is particularly favorable when the reversing lever is arranged on a side of one of the bearing side walls, preferably the first bearing side wall which is located opposite the bearing head.

With respect to an additional securing of the bearing head in the fixing position, no further details have been given in conjunction with the preceding explanations concerning the individual embodiments.

One particularly advantageous embodiment, for example, provides for the bearing head to be blocked by a blocking device against any movement from the fixing position in the direction of the release position and, therefore, an additional securing against any release of the ball neck fixing means to be present.

This blocking device can, in principle, be arranged at the most varied of locations.

In order to be able to absorb the forces acting on the blocking device from the bearing head as advantageously as possible, it is preferably provided for the blocking device to be supported on the bearing part.

In this respect, it is particularly favorable when the blocking device is supported on one of the bearing side walls of the bearing part, preferably on the side wall which bears the form locking elements arranged on the bearing part.

With respect to the actuation of the blocking device, no further details have so far been given.

It would, for example, be conceivable to actuate the blocking device either itself and independently of the positioning device or also, for example, to actuate the blocking device via the positioning device.

It is, however, particularly advantageous when the blocking device can be actuated by the triggering device.

In this respect, the blocking device is preferably coupled mechanically to the triggering device with respect to its functioning so that the transfer of the positioning device from the fixing position into the release position leads to a release of the blocking device coupled mechanically thereto.

In this respect, it is particularly advantageous when the blocking device can be actuated with the triggering device in a defined synchronization in relation to the actuation of the positioning device so that the functioning of the positioning device may be definitively adjusted to the operation of the blocking device and, therefore, a reliable and secure functioning of the trailer coupling can be achieved.

In this respect, it is particularly favorable when the triggering device terminates the effect of the blocking device during the transfer from the fixing position into the release position before the positioning device begins to bring the form locking elements out of engagement.

Furthermore, it is advantageous when the triggering device, during the transfer from the release position into the fixing position, first causes the positioning device to bring the form locking elements into engagement and then causes the blocking device to become active.

With respect to the design of the blocking device, no further details have so far been given. One particularly advantageous embodiment, for example, provides for the blocking device to be designed to be self-readjusting, i.e., for the blocking device not only to block any movement of the bearing head beyond a specific, predetermined position but also, for example, to always follow the position of the bearing head when wear and tear occurs to the extent that this position is adjusted when the fixing position or tensioning position is taken up or also during the course of the fixing position or tensioning position.

Therefore, the blocking device also follows, for example, the position of the bearing head which is adjusted, for example, in the case of wear and tear in the fixing position or tensioning position once taken up and so the readjustment is not only effected when the respective fixing position or tensioning position is taken up but rather the blocking device also acts in a self-readjusting manner in the position once taken up and maintains the respective resulting maximum displacement in the direction of any taking up of the fixing position or the tensioning position.

It is even better when the blocking device not only acts in a self-readjusting manner but acts on the bearing part in its active position with a force contributing to the tensioning force so that the blocking device can also be used at the same time for contributing to the tensioning force.

For this purpose, the blocking device is preferably provided with a force storing means, in particular a mechanical force storing means, such as, for example, a spring force storing means.

The blocking device can, for example, be designed such that it acts directly on the bearing member with a blocking wedge.

For example, it is conceivable to have a blocking wedge supported on the bearing part acting directly on the bearing member.

Such a blocking wedge could be provided, for example, between the bearing member and a bearing side wall.

A particularly favorable arrangement of the blocking device does, however, provide for this to act on the coupling device.

This arrangement of the blocking device makes it possible to arrange it on a side of a bearing side wall of the bearing part facing away from the bearing head.

Such a blocking device is preferably designed such that it comprises a blocking member which interacts with the coupling device and the bearing part.

In this respect, the blocking member is preferably arranged such that it is supported on the bearing side wall bearing the form locking elements arranged on the bearing part.

With respect to the arrangement of the blocking device relative to the positioning device, no further details have so far been given. One advantageous solution provides, on account of their functional interaction, for the blocking device and the positioning device to be arranged on the same side of the bearing part.

Furthermore, a mechanical interaction of the blocking device and the triggering device is facilitated when the blocking device and the triggering device are arranged on the same side of the bearing part.

With respect to the arrangement of the form locking elements on the bearing head, no further details have so far been given. The form locking elements arranged on the bearing head could, in principle, be arranged on all sides of the bearing head.

It is particularly advantageous when the bearing head has a bearing bore which extends at an angle to the horizontal in the state mounted on the vehicle and when the form locking elements are arranged on the side of the bearing head, on which the bearing bore extends closer to the roadway than on the other.

This solution has the advantage that in this area the bearing head can have a greater radial extension in relation to the bearing bore and, therefore, it is possible to arrange the form locking elements in a more stable manner and with a greater radius in relation to the bearing bore and, therefore, to provide a more rigid connection to the bearing part.

Furthermore, in the case of a bearing pin extending at an angle to the horizontal the bearing pin is mounted on the bearing part, preferably on a bearing side wall thereof, at least on its side closest to the roadway.

In the case where the bearing pin is mounted on two bearing side walls, the form locking elements are preferably arranged on the bearing side wall which mounts the bearing pin in its end area located closest to the roadway.

With respect to the arrangement of the form locking elements themselves, the most varied of solution possibilities are conceivable. For example, the form locking elements could be arranged so as to be movable.

With a view to as simple a constructional solution as possible and a mounting which is as free from play as possible, the form locking elements on the bearing part are preferably arranged so as to be stationary.

Furthermore, the form locking elements on the bearing head are also preferably arranged so as to be stationary.

Such a stationary arrangement is to be understood such that the form locking elements are arranged relative to the bearing part or relative to the bearing head so as to be unmovable, i.e., connected rigidly to it.

With respect to the type of interaction of the form locking elements in the operative position and the rest position, no further details have so far been given.

It is particularly advantageous when, in the operative position, one part of the form locking elements located in fixing position is in engagement and another part is not.

Furthermore, it is preferably provided for one part of the form locking elements located in fixing position to be in engagement in the rest position and another part not.

This solution has the advantage that the angular distance between the rest position and the operative position need not be designed in accordance with possible rotational symmetries, i.e., for example, a two-fold or three-fold or four-fold symmetry of the angular distance itself or a multiple thereof would define the possible angular distance between operative position and rest position, but rather that the angular distance can be determined irrespective of the number of form locking elements used.

One advantageous solution provides for at least one first form locking element to be arranged on the bearing part or on the bearing head which is in engagement with a form locking element on the respectively other part only in the operative position and for at least one second form locking element to be arranged on the bearing part or on the bearing head which is in engagement with a form locking element on the respectively other part only in the rest position.

This means that two groups of form locking elements are provided on one of the two parts, wherein the one group is provided for the fixing of the operative position and the other group for the fixing of the rest position while the form locking elements on the other part can be designed such that they are all respectively in engagement either with the one group or with the other group.

In order to bring about a fixing of the bearing head relative to the bearing part which is as free from play as possible, it is preferably provided for at least one form locking element of a pair of form locking elements which are in engagement to have a surface which extends at an angle to a direction of movement of the bearing head and can be abutted on the other form locking element of the pair of form locking elements in a tensioning position so that a tensioning between the form locking elements and, therefore, a fixing of the form locking elements relative to one another which is free from play is possible via this surface extending at an angle.

In this respect, it is preferably provided, in the operative position, for the at least one pair of form locking elements which are in engagement to be acted upon in the tensioning position with a tensioning force in an insertion direction in order to fix the bearing head on the bearing part free from play.

The same measures may, however, also be provided in the rest position in order to achieve a fixing which is free from play in this position.

In order to bring about a fixing which is free from play and as precise as possible, it is preferably provided, in the operative position and/or the rest position, for at least two pairs of form locking elements to be brought into the tensioning position and acted upon with the tensioning force.

It is even more advantageous when, in the operative position and/or the rest position, at least three pairs of form locking elements can be brought into the tensioning position and acted upon with the tensioning force.

The provision of at least three pairs of form locking elements has the great advantage that, as a result, a stable support of the bearing head relative to the bearing part can be realized in the form of a tripod.

The support of the bearing head is particularly stable and free from play when this is supported on the bearing part essentially via the pairs of form locking elements in the operative position and in the tensioning position of the pairs of form locking elements, i.e., no other additional support of the bearing head is brought about and, therefore, solely the pairs of form locking elements are active.

Furthermore, it is particularly advantageous when the position of the bearing head is determined relative to the bearing part essentially via the pairs of form locking elements in the operative position and in the tensioning position of the pairs of form locking elements, wherein any overdetermination by the bearing pin is, in particular, avoided which has therefore to be provided with sufficient clearance.

This exclusive securing of the bearing head relative to the bearing part via the pairs of form locking elements improves the freedom from play and precision of the positioning of the bearing head.

The same preferably applies for the rest position, as well.

In order to prevent the ball neck, during pivoting from the operative position into the rest position, from remaining in a position which does not correspond to either of the two positions and an apparent fixing from taking place in this position, it is preferably provided for the ball neck fixing means to be designed such that the form locking elements can be brought into form locking engagement only in the operative position and the rest position. This solution has the advantage that, as a result, any apparent fixing in an intermediate position can be prevented and, therefore, it is ensured that the inventive trailer coupling has the possibility of transferring from the release position into the fixing position or tensioning position only in the operative position and only in the rest position.

This may preferably be realized in that the ball neck fixing means comprises guide elements which prevent any engagement of the form locking elements in intermediate positions between the operative position and the rest position.

With respect to the possibilities of initiating the rotary movement of the bearing head in order to move the ball neck from the operative position into the rest position or vice versa, the most varied of possibilities are conceivable.

For example, it would be conceivable to initiate the rotary movement via the bearing bolt.

It is, however, particularly advantageous within the scope of the inventive solution when the bearing head is arranged on the bearing pin so as to be freely rotatable.

This makes it possible, for example, to provide all the possible, different types of pivoting of the bearing head relative to the bearing part.

In this respect, one advantageous solution provides for the ball neck to be pivotable manually.

In this case, the bearing head has to be moved only from the fixing position or tensioning position into the release position and, in this position, a manual pivoting is possible on account of the freely rotatable mounting of the bearing head.

Alternatively thereto, one advantageous solution provides for an electrically controllable pivot drive to be provided for the ball neck.

This electrically controllable pivot drive allows a more convenient operation of the trailer coupling and, in addition, such an electrically controllable pivot drive offers the possibility of realizing additional advantageous safety functions via an electrical control.

A particularly advantageous solution provides for the pivot drive to have an electric drive motor.

In this respect, it is preferably provided for the pivot drive to comprise a releasable coupling which allows a manual pivoting of the back neck when the pivot drive fails.

Such a releasable coupling has the great advantage that even with provision of an electric drive motor and failure of the electrics it is still possible to move the ball neck out of every intermediate position either into the operative position or into the rest position.

Such a releasable coupling could, for example, also be a coupling which is automatically released in the case of a power outage.

It is, however, particularly advantageous when the releasable coupling is a slip coupling which is configured such that its triggering moment can be reached when the ball neck is acted upon manually so that when the electric drive fails the pivoting of the ball neck out of every intermediate position into the operative position or the rest position can be realized manually.

Additional features and advantages are the subject matter of the following description as well as the drawings illustrating two embodiments.

In the drawings:

FIG. 19 shows an illustration similar to FIG. 13 with a positioning device in release position according to FIG. 17;

FIG. 20 shows an illustration of bearing head, coupling device and a part of the positioning device with a ball neck in operative position and a positioning device in release position;

FIG. 24 shows a plan view from above of the second embodiment with a housing removed accordingly and FIG. 25 shows a partial section through bearing part, bearing head and pinion for driving the bearing head in the second embodiment with a sectional plane extending through the axis of the bearing pin and the axis of the pinion.

Figure 1:
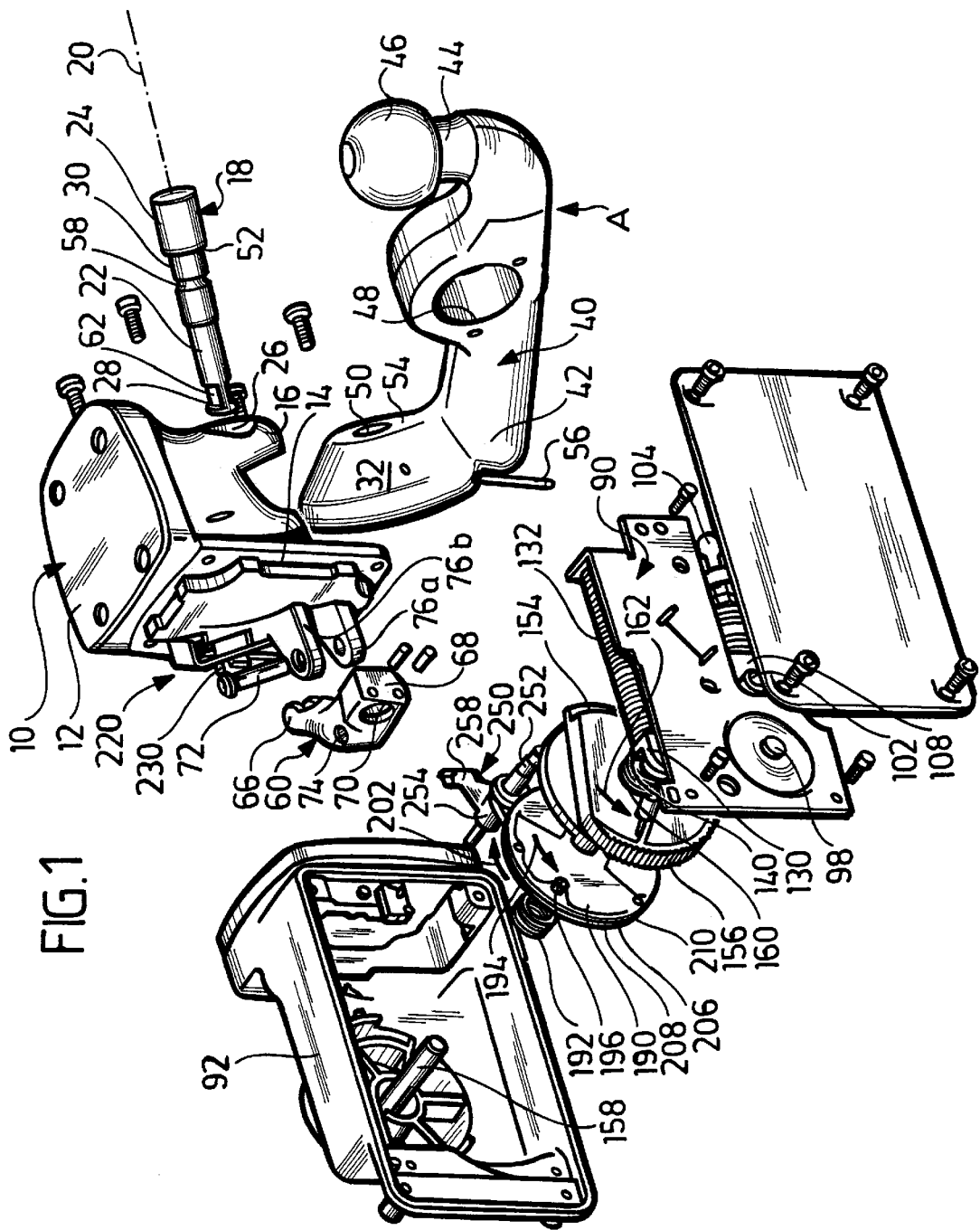
FIG. 1 shows an exploded illustration of a first embodiment of an inventive trailer coupling.

A first embodiment of an inventive trailer coupling illustrated in FIG. 1 comprises a bearing part which is designated as a whole as 10 and can be mounted with an upper section 12 so as to be stationary on the vehicle.

The bearing part 10 comprises for its part a first bearing side wall 14 which extends downwards from the upper section 12, i.e., in the direction of a roadway in the state mounted on the motor vehicle as well as a second bearing side wall 16 which is arranged at a distance from the first side wall and likewise starts from the upper section 12.

Not only the first bearing side wall 14 but also the second bearing side wall 16 are provided with openings for the insertion of a bearing pin 18, the bearing axis 20 of which is arranged, in relation to a longitudinal and transverse direction of the motor vehicle, so as to extend at an angle in the space, in particular, at an angle to a horizontal line and at an angle to a longitudinal central plane of the motor vehicle, as described, for example, in the European patent application relating to DE 196 12 959, to which reference is made in full with respect to the angles for the alignment of the bearing axis 20.

The bearing pin 18 has a first section 22 which is mounted in the opening in the first bearing side wall 14 which is not apparent in FIG. 1 and a second section 24 which is mounted in an opening 26 of the second bearing side wall 16 as well as an end section 28 which—as will be explained later on in detail—projects beyond the first bearing side wall 14 on a side located opposite the second bearing side wall 16. The first section 22 is located closer to the roadway than the second section 24 of the bearing pin 18 due to the angled extension of the bearing pin 18.

A bearing section 30 is provided between the first section 22 and the second section 24 of the bearing pin 18 and serves for the rotatable mounting of a bearing head 32 of a ball neck which is designated as a whole as 40 and merges into the bearing head 32 in the area of one end 42 and bears a coupling ball 46 in the area of another end 44.

The ball neck 40 is preferably provided, in addition, with a receiving means 48 for an electric plug connection in the area between its ends 42 and 44.

The bearing head 32 is provided, for its pivotable mounting, with a bearing bore 50 which passes through the bearing pin 18, namely such that the bearing section 30 is located in the bearing bore 50.

In order, as will be explained in detail later on, to be able to act on the bearing head 32 with the bearing pin 18 in the direction of the first bearing side wall 14, a flange 52 is provided between the bearing section 30 and the second section 24 of the bearing pin 18 and the bearing head 32 can be acted upon with this flange on its side 54 facing away from the first side wall 14. This flange 52 is preferably formed by a step which results due to the fact that the second section 24 has a greater diameter than the bearing section 30.

Furthermore, a peg 56 which passes through the bearing head 32 and is tangent to the bearing bore 50 is provided on the bearing pin 18 for guiding the bearing head 32 so as to be non-displaceable in the direction of the bearing axis 20 but freely rotatable and this peg 56 engages in a circumferential groove 58 in the area of the bearing section 30 and, therefore, secures the bearing head 32 in an axial direction relative to the bearing pin 18.

Figure 2:
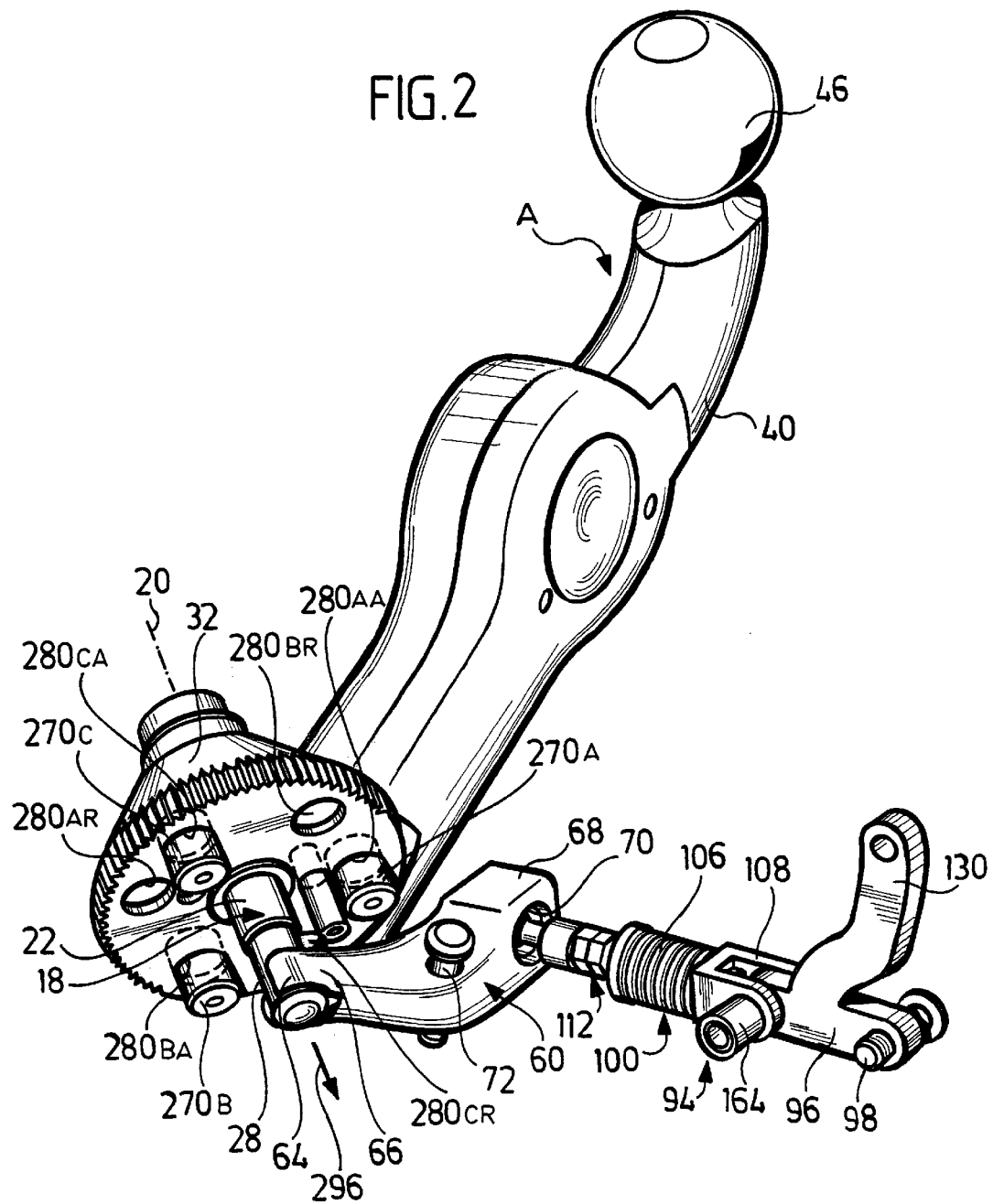
FIG. 2 shows a sectional, perspective illustration of ball neck, bearing head, coupling device and a part of a positioning device in operative position and fixing position of form locking elements.

The end section 28 of the bearing pin 18 is coupled to a reversing lever designated as a whole as 60, namely preferably due to the fact that the end section 28, as is also apparent in FIG. 2, is provided with recesses 62, into which fingers 64 of a forked part 66 formed at one end of the reversing lever 60 engage so that the end section 28 is guided in the forked part 66, namely such that the forked part 66 is fixed in the recesses 62 and, therefore, relative to the bearing pin 18 essentially so as to be non-displaceable in the direction of the bearing axis 20.

The reversing lever 60 has, in addition, an end 68 which is located opposite the forked part 66 and is provided with a receiving means 70, via which the reversing lever 60 is acted upon.

Furthermore, the reversing lever 60 is mounted on the first bearing side wall 14, namely on the side located opposite the second bearing side wall 16, so as to be pivotable by means of a bolt 72 which passes through a bore 74 in the reversing lever 60. In this respect, the bolt 72 is preferably held by bearing projections 76a, 76b which are arranged in spaced relationship to one another, wherein the reversing lever 60 is located between these bearing projections 76a and 76b and is, therefore, also guided by them.

As illustrated in FIG. 2, the bearing pin 18 forms, together with the reversing lever 60, a coupling device which is designated as a whole as 80 and with which the bearing head 32 can be displaced in the direction of the bearing axis 20, wherein the bearing pin 18 undertakes at the same time the task of the freely rotatable mounting of the bearing head 32 about the axis 20 as pivot axis.

A positioning device which is designated as a whole as 90 and is arranged in a housing 92 held by the first bearing side wall 14 acts on the coupling device 80 via the receiving means 70 at the end 68 of the reversing lever 60.

Figure 3:
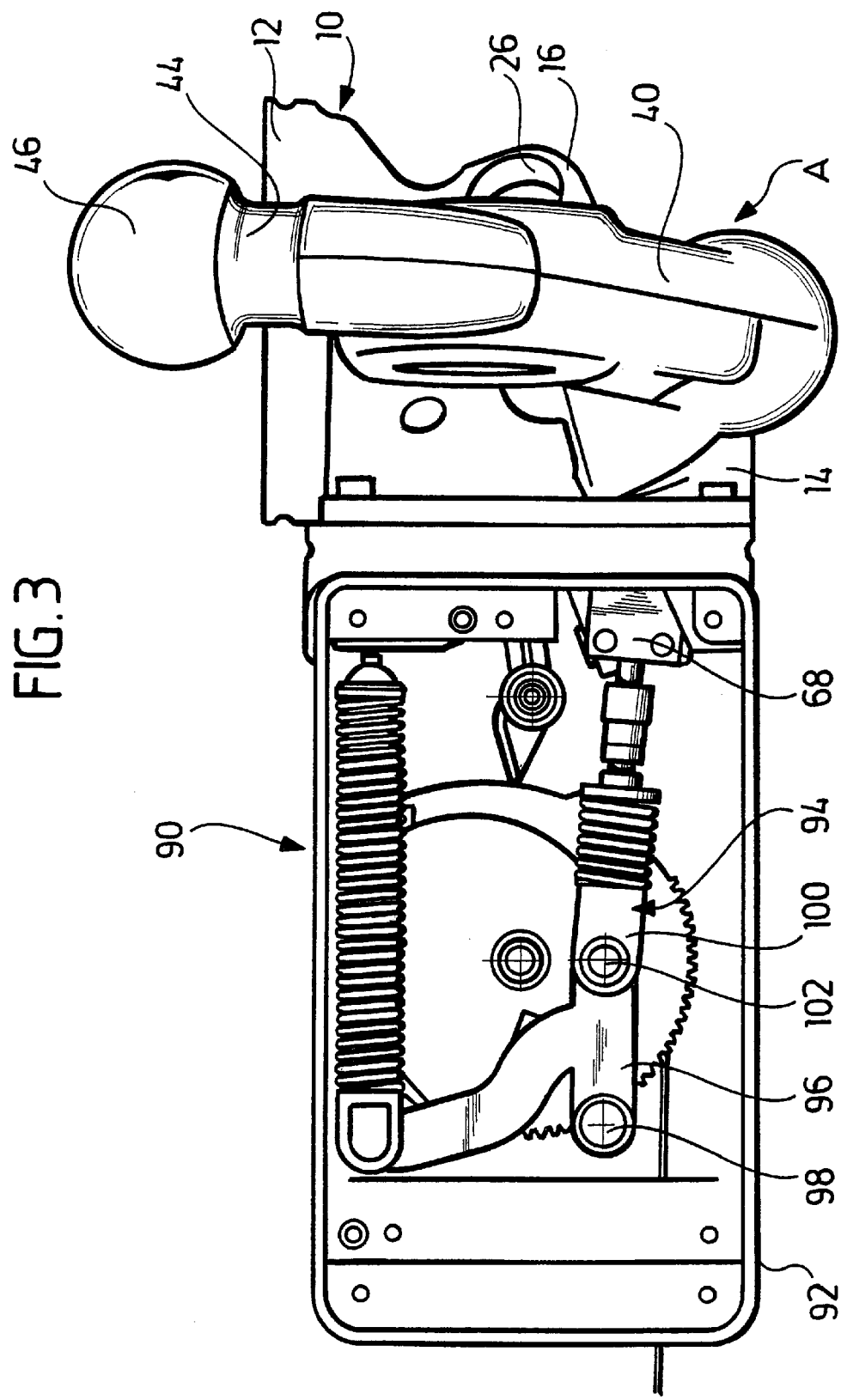
FIG. 3 shows a plan view of the trailer coupling of the first embodiment viewed in the direction from the rear side of a vehicle with a ball neck in operative position and looking onto the positioning device.
Figure 4:
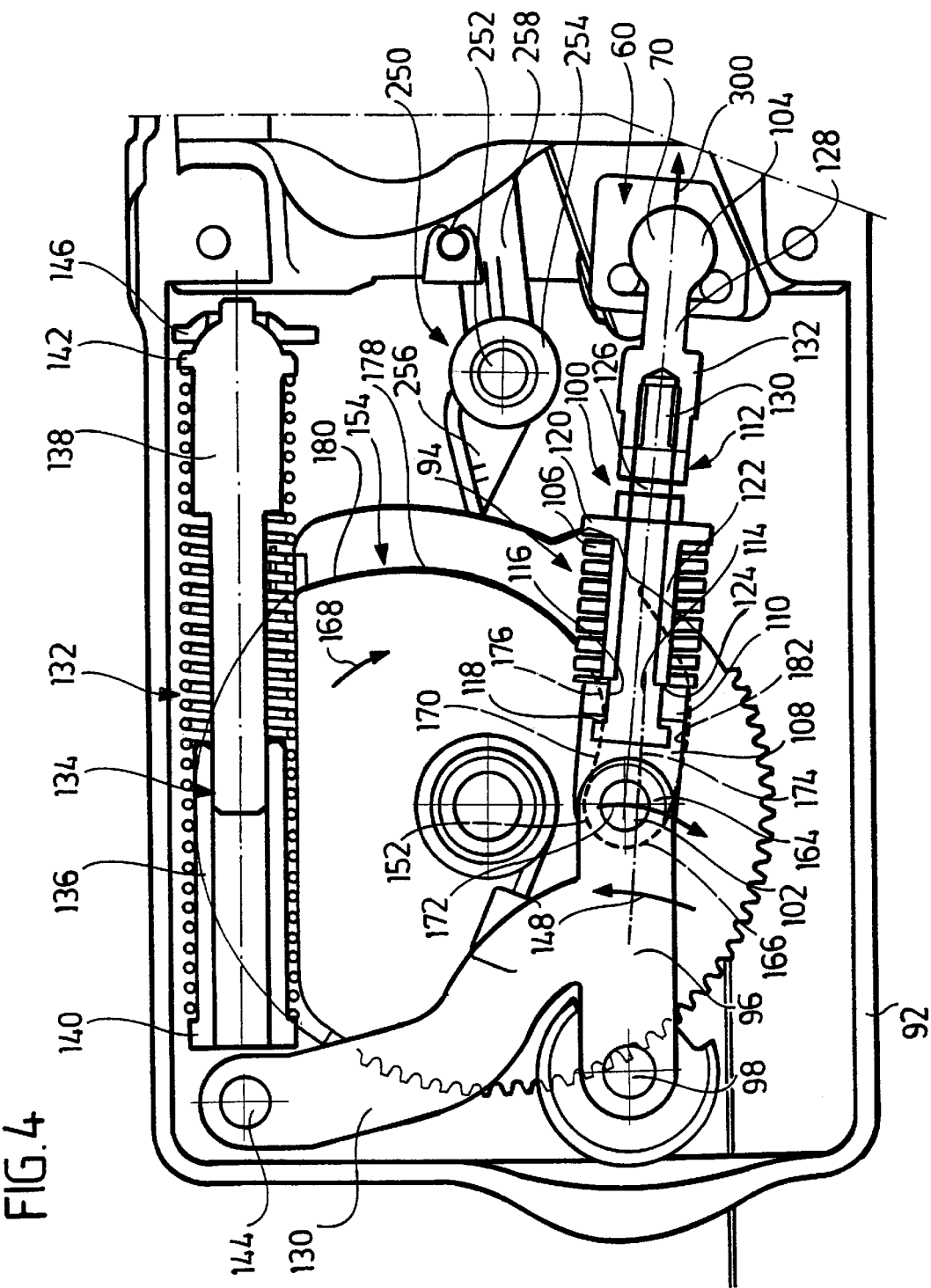
FIG. 4 shows an enlarged and partially cutaway view of the positioning device similar to FIG. 3 in a fixing or tensioning position.

The positioning device 90, as illustrated, in particular, in FIGS. 3 and 4, comprises an elbow lever mechanism 94 which is formed by a first lever 96, which is mounted for rotation on a bearing 98 arranged securely on the housing 92, as well as a second lever 100 which is connected to the first lever 96 via an elbow joint 102, wherein the elbow joint 102 is preferably arranged at an end of the first lever 96 located opposite the bearing 98.

The second lever 100 extends, proceeding from the elbow joint, in the direction of the receiving means 70 of the reversing lever 60 and engages in this with a sphere 104, wherein the sphere 104 is secured in the receiving means 70 of the reversing lever 60 in such a manner that an articulated connection exists which otherwise, however, also transfers pull and pressure actions from the elbow lever mechanism 94 to the reversing lever 60, as illustrated in FIG. 4.

In addition, the second lever 100 of the elbow lever mechanism 94, as likewise illustrated in FIG. 4, is variable in its length by means of a cup spring assembly 106, wherein the second lever 100 comprises a first lever member 108 which extends from the elbow joint 102 and has at an end located opposite the elbow joint 102 a bearing receiving means 110 for a second lever member 112 which is guided with a head 114 in a guide bore 116 of the bearing receiving means 110 and is limited in its movability away from the elbow joint 102 in the sense of an extension of the second lever 100 by means of a flange 118 which is located on a side of the bearing receiving means 110 located opposite the elbow joint 102.

The cup spring assembly 106 is supported, on the one hand, on a side of the bearing receiving means 110 located opposite the elbow joint 102 and, on the other hand, on a flange ring 120 which is connected securely but adjustably to the second lever member 112.

As a result, the cup spring assembly 106 acts in the direction of an extension of the second lever 100 due to the fact that it attempts to move the second lever member 112 away from the elbow joint 102, wherein this displacement is limited, on the other hand, by the flange 118 of the head 114 which abuts on the bearing receiving means 110 on a side facing the elbow joint 102.

As a result, the second lever 100 can, however, also be shortened in its length but contrary to the action of the cup spring assembly 106, wherein the shortening of the second lever 100 is limited by a sleeve 122 which is securely connected to the flange ring 120, passes through the cup spring assembly 106 and at maximum shortening abuts with its end face 124 on the bearing receiving means 110.

In addition, the second lever member 112 can be securely adjusted in its length, namely due to the fact that this has a first lever section 126, which bears the head 114 and passes through not only the sleeve 122 but also the cup spring assembly 106 as well as the flange ring 120, as well as a second lever section 128 bearing the sphere 104, wherein the first lever section 126 engages, for example, with an end 130 in a receiving means 132 of the second lever section 128 and can be secured, for example, by a thread.

Furthermore, the first lever 96 of the elbow lever mechanism 94 is provided with an arm 130 which preferably extends transversely to the first lever 96 and on which a helical spring 132 representing a pressure force storing means acts.

The helical spring 132 is guided by a guide means 134 variable in length, comprising a first guide element 136 and a second guide element 138, and is clamped between a flange 140 of the first guide element 136 and a flange 142 of the second guide element 138.

The helical spring 132 acts on the arm 130 and, therefore, the first lever 96 via the first guide element 136 which is connected to the arm 130 via a joint 144, wherein the helical spring 132 is supported via the second guide element 138 on an abutment 146 provided securely on the housing 92.

On account of the design of the helical spring 132 as a pressure spring, this always attempts to extend and thereby, via the arm 130, causes the first lever 96 to have the tendency to pivot in the direction 148 about the bearing 98. In a fixing position or tensioning position of the positioning device 90, the purpose of which will be explained in the following, this pivoting of the first lever 96 in the direction 148 is limited in an over dead center position of the elbow lever mechanism 94 illustrated in FIG. 4, in this embodiment by means of a triggering device designated as a whole as 150, namely by an end section 152 of a cam path 154 which is arranged on a regulator wheel 156.

The regulator wheel 156 is mounted for its part in the housing 92 via a bearing pin 158 so as to be rotatable and is acted upon by a torsion spring 160, which engages, on the one hand, on the housing 92 and, on the other hand, acts on the regulator wheel 156, so as to turn in a direction 162 so that the regulator wheel 156 turns the cam path 154 in such a manner that a path follower 164 arranged on the elbow joint 102, for example, designed as a roller abuts on the end section 152 in the case of exclusive action of the torsion spring 160 on the regulator wheel 156, wherein the rotation of the regulator wheel 156 is thereby limited by an end 166 of the cam path 154 adjoining the end section 152.

A rotation of the regulator wheel 156 in a direction 168, which extends contrary to the direction 162, causes the positioning device 90 to leave the tensioning or fixing position and the end section 152 to move away from the path follower 164 so that a first cam section 170 adjoining the end section 152 acts on the path follower 164 in such a manner that the elbow lever mechanism 94 moves in the direction 172 into the extended position, indicated by the dashed line 174, which also corresponds to the dead center position of the elbow lever mechanism 94. In this extended position, the second lever 100 is shortened due to compression of the cup spring assembly 106.

An additional, second cam section 176 of the cam path 154, which adjoins the first cam section 152, acts further on the path follower 164 in the direction 172 and moves the elbow lever mechanism 94 beyond the extended position 174. During this movement, the cup spring assembly 126 allows an extension of the second lever 100 so that the distance of the sphere 104 from the bearing 98 can remain unchanged. During further movement of the path follower 164 in the direction 172, the second lever 100 is extended due to the action of the spring assembly as far as a position, in which the second lever 100 has reached the maximum length, determined by the cup spring assembly 106 and the flange 118 of the head 114 which interacts with the bearing receiving means 110. This is approximately the position which corresponds to the end of the second cam section 176 located opposite the first cam section 170.

Figure 5:
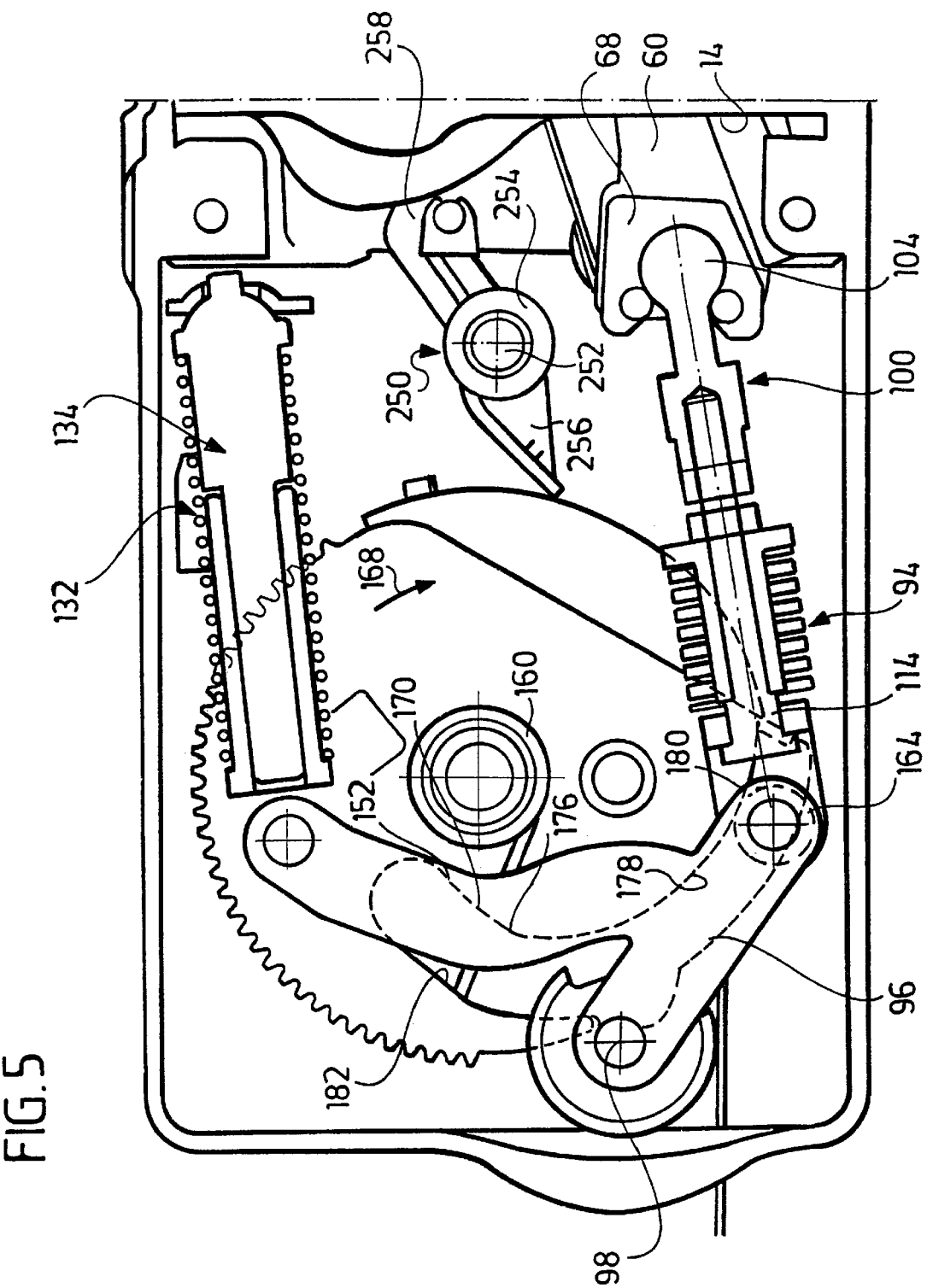
FIG. 5 shows a view in accordance with FIG. 4 in a release position.

A third cam section 178 adjoining the second cam section 176 then becomes active and moves the path follower 164 in the direction 172 and further contrary to the force of the helical spring 132, wherein the distance between the sphere 104 and the bearing 98 is then shortened. This continues, for example, to such an extent until a position illustrated in FIG. 5 is reached, in which the path follower 164 is in an end area 180 of the third cam section 178. In this position, the helical spring 132 is in its position compressed to a maximum which is predetermined, for example, by the guide means 134. The shortening of the distance between the sphere 104 and the bearing 98 now leads to the elbow lever mechanism 94 moving the end 68 of the reversing lever 60 away from the first bearing side wall 14 and, therefore, the reversing lever 60 moving with the forked part 66 in the direction of the first bearing side wall 14 and, thereby, displacing the bearing pin 18 in the direction of the second bearing side wall, whereby a displacement of the bearing head 32 in the direction of the second bearing side wall 16 likewise results.

This movement of the elbow lever mechanism 94 requires an active rotation of the regulator wheel 156 in the direction 168, wherein the cam path 154 forms together with the path follower 164 a cam gear with a force amplification.

If the action on the regulator wheel 156 is discontinued, the regulator wheel 156 turns back in the direction 162 due to the action of the torsion spring 160, wherein the cam path 154 with the sections already specified slides along the path follower 164 and thus, on account of the force of the helical spring 132, causes the path follower 164 to return to the over dead center position illustrated in FIG. 4, in which the path follower 164 abuts, on the one hand, on the end section 152 of the cam path 154 and, on the other hand, on the end 166 thereof.

Furthermore, a counter cam 182 following the cam sections 176 and 170 is provided along these sections and, in the position illustrated in FIG. 4, secures the path follower 164 in the position illustrated in FIG. 4 and prevents it from being able to move automatically in the direction 172 without the regulator wheel 156 being turned.

As a result, a securing of the elbow lever mechanism 94 is achieved in the over dead center position illustrated in FIG. 4 which corresponds to the tensioning position as a fixing position.

Figure 6:
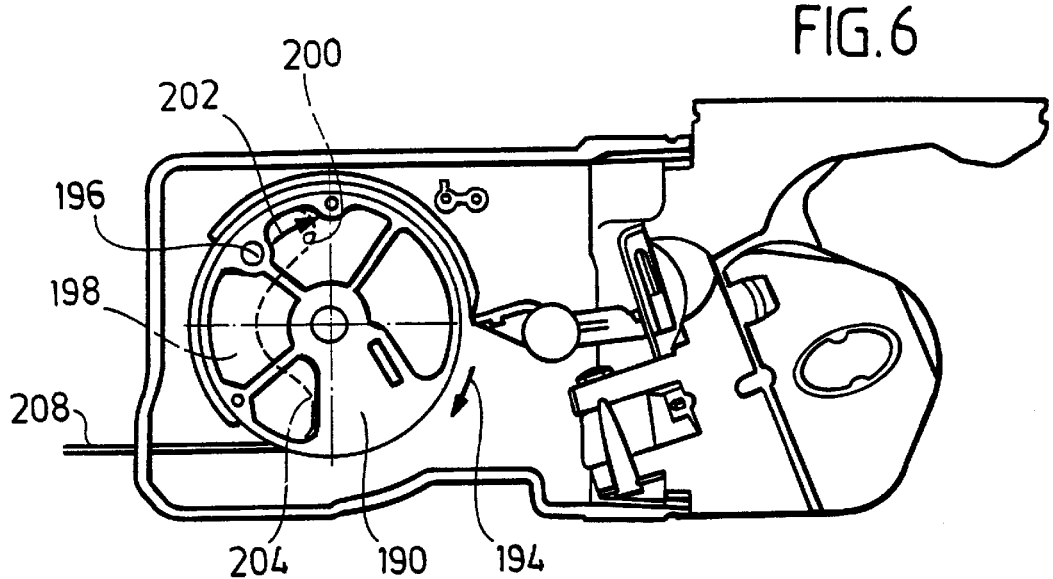
FIG. 6 shows a sectional view of one part of an inventive triggering device.

In order to turn the regulator wheel 156, the triggering device 150 comprises, in addition, a drive wheel 190 which is likewise mounted on the bearing pin 158 on the housing 92 and is acted upon with a torsion spring 192 in a direction 194 corresponding to the direction 162, wherein the drive wheel 190 engages with a pin 196 in a recess 198, which is illustrated in FIG. 6 and provided in an arc shape around the bearing pin 158 in the regulator wheel 156, and abuts in the non-acting position close to an end 200. The recess 198 allows a free rotatability of the drive wheel 190 relative to the regulator wheel 156 in a direction 202, wherein this rotatability acts contrary to the torsion spring 192. When the end 200 of the recess 198 is reached, the regulator wheel 156 is taken along by the drive wheel 190 in the direction 168 in order to move the elbow lever mechanism 94 from the over dead center position or tensioning position illustrated in FIG. 4 as far as the release position illustrated in FIG. 5.

The length of the arc of the recess 198 from a beginning 204 as far as the end 200 corresponds to the arc which is necessary in order to cause the drive wheel 190 to return to the initial position while the regulator wheel 156 remains in a release position corresponding to FIG. 5, in which the end area 180 of the third cam section 178 acts on the path follower 164, for reasons which will be explained in detail in the following.

In order to be able to act manually on the drive wheel 190, this is provided with a receiving groove 206 extending circumferentially for a traction cable 208 which is secured to the drive wheel 190 with one end 210 and is guided out of the housing 92 so that rotation of the drive wheel 190 in the direction 202 can be brought about by pulling on the traction cable 208.

Figure 7:
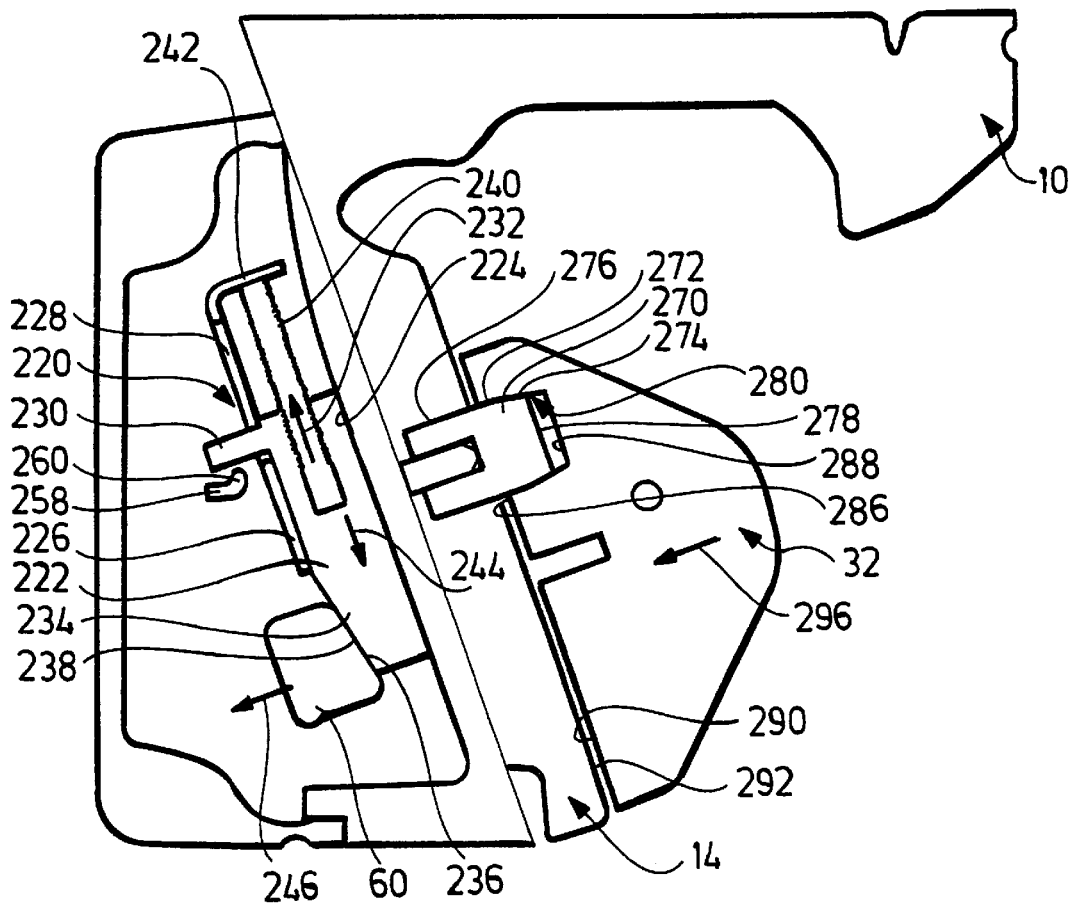
FIG. 7 shows a section through bearing part and bearing head approximately parallel to a pivot axis of the bearing head in the area of a pair of form locking elements and a blocking device arranged on the bearing part.
Figure 8:
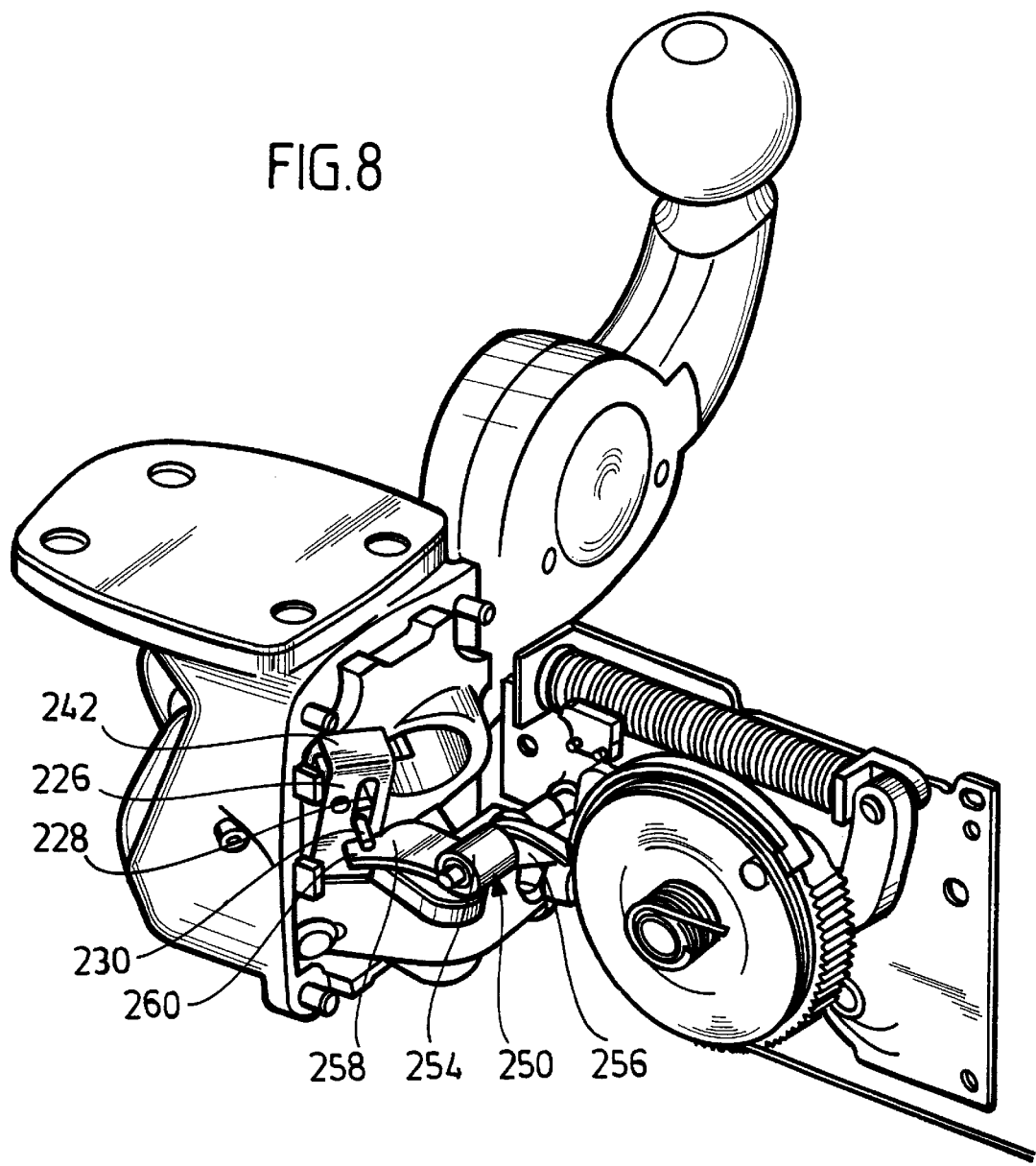
FIG. 8 shows a perspective view of the first embodiment of the inventive trailer coupling viewed in a direction opposite to the direction of view according to FIG. 3.
Figure 9:
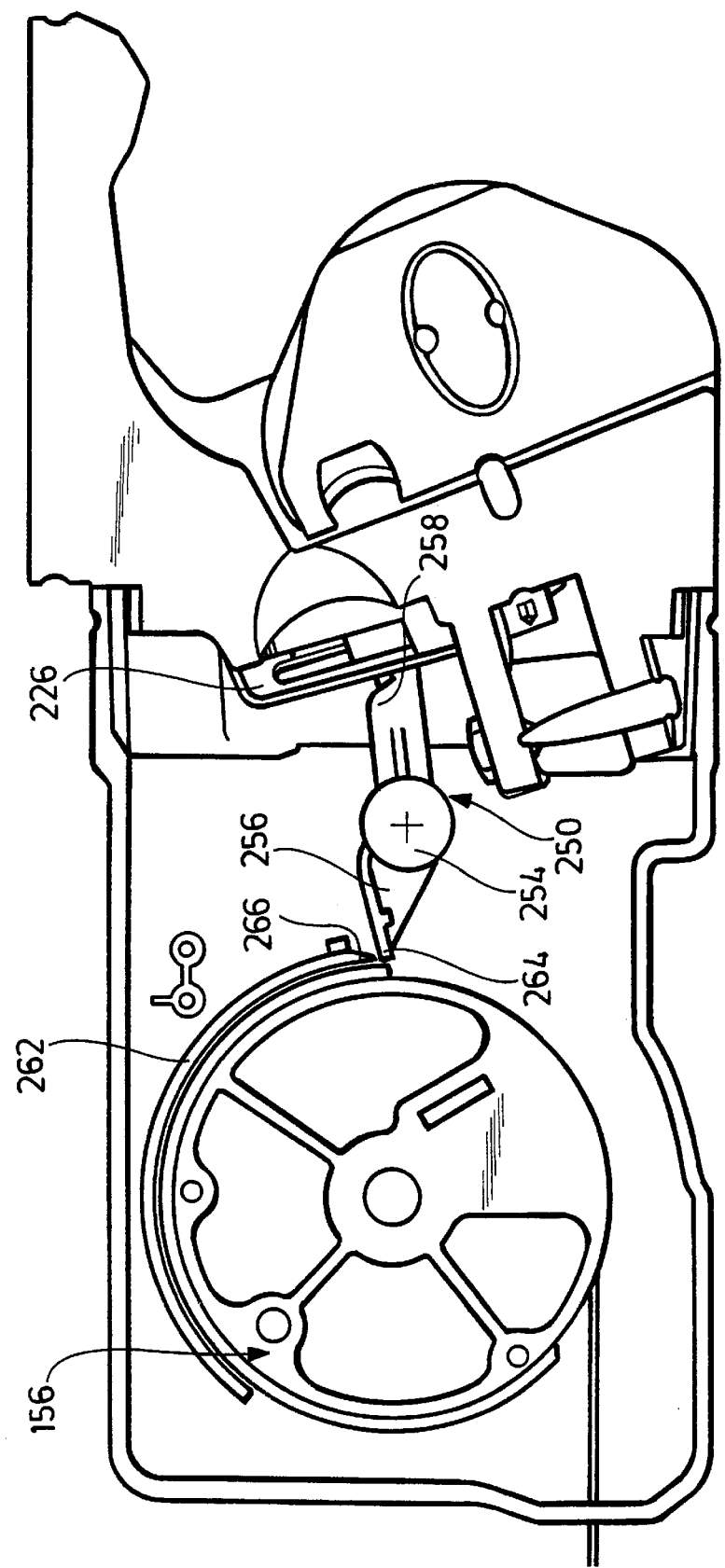
FIG. 9 shows a section in the area of an actuating cam of a triggering device with actuating rocker for a blocking device.

Furthermore, the inventive trailer coupling comprises a blocking device which is designated as a whole as 220 and is apparent in FIGS. 1, 7 and 8 and has a displacing wedge 222 which is arranged on the side of the first bearing side wall 14 facing away from the second bearing side wall 16 and can be displaced along a slide surface 224 which is arranged on this side of the first bearing side wall 14.

The displacing wedge 222 is guided altogether between the slide surface 224 and a displacing wedge housing 226 which is held on the first bearing side wall 14 and is provided, in addition, with a recess 228, from which an actuating pin 230 integrally formed on the displacing wedge 222 projects.

The displacing wedge 222 can be displaced forwards and backwards altogether in a direction 232 which extends approximately transversely to the longitudinal extension of the reversing lever 60 and comprises a wedge section 234 which, as illustrated in FIG. 7, can be inserted into a space between the slide surface 224 and a rear side 236 of the reversing lever 60 facing the slide surface 224, wherein the wedge section 234 abuts on the rear side 236 with a wedge surface 238 in the position illustrated in FIG. 7 which corresponds to the tensioning position, in which the positioning device 90 acts with the sphere 104 on the receiving means 70 at the end 68 of the reversing lever 60 in such a manner that the end 68 is in its position located closest to the first bearing side wall 14 and, therefore, the forked part 66 has the greatest possible distance from the first bearing side wall 14.

As a result, the displacing wedge 222, in its position illustrated in FIG. 7 and engaging between the rear side 236 and the slide surface 224 of the first bearing side wall 14, blocks any movement of the reversing lever 60 with its section located close to the forked part 66 and having the rear side 236 in the direction of the first bearing side wall 14 and therefore prevents the bearing pin 18 and, with it, also the bearing head 32 from being able to move away from the first bearing side wall 14 in the direction of the release position.

The displacing wedge 222 is acted upon with a pressure spring 240 which is supported on an upper section 242 of the displacing wedge housing 226 and acts on the displacing wedge 222 in such a manner that this always attempts to engage with the wedge section 234 as far as possible into the space between the rear side 236 of the reversing lever 60 and the slide surface 224. Furthermore, the wedge surface 238 extending in a wedge shape in relation to the slide surface 224 causes, on account of the displacing wedge 222 being acted upon in the direction 244, a force acting on the rear side 236 of the reversing lever 60 with a pressure force 246 and, therefore, a force which acts on the reversing lever 60 close to the forked part 66 and, thus, also contributes to the action on the bearing pin 18 with a tensioning force.

In order to be able to displace the displacing wedge 222 in a direction contrary to the direction of force 244 of the pressure spring 240, the actuating pin 230 can be actuated by means of an actuating rocker which is designated as a whole as 250, is mounted on a bearing bolt 252 in the housing 292 so as to be pivotable and has two arms 256 and 258 proceeding from a bearing member 254, wherein the arm 258 extends from the bearing member 254 in the direction of the actuating pin 230 and can act on the actuating pin 230 with an end area 260 while the arm 256 extends in the direction of the regulator wheel 156, as illustrated in FIGS. 4 and 8.

The actuating rocker 250 interacts with an actuating cam 262 provided on the regulator wheel 156, wherein the actuating cam 262 can act on an end 264 of the arm 256.

The actuating cam 262 preferably has an initial section 266 which is at a slight distance from the end 264 in the case of a non-actuated actuating rocker 250, wherein the end 264 of the actuating rocker 250 is acted upon by the actuating cam 262 immediately after the regulator wheel 156 begins to turn out of the tensioning position in a direction 168, this actuation leading to a displacement of the displacing wedge 222 in a direction contrary to the direction of force 244 of the pressure spring 240 and, therefore, guiding the wedge section 234 out of the space between the rear side 236 of the reversing lever 60 and the slide surface 224 so that the reversing lever 60 can be moved with the forked part 66 in the direction of the first bearing side wall 14.

In order to be able to secure the bearing head 32, the first bearing side wall 14 is provided with at least one form locking element 270 arranged on the bearing part which has a cylindrical form locking section 272 and a conical form locking section 274 which are arranged so as to follow one another, wherein the cylindrical form locking section 272 adjoins a cylindrical anchoring section 276 of the form locking element 170 arranged on the bearing part and following the cylindrical form locking section 272 the conical form locking section 274 extends as far as an end face 278 of the form locking element 270 arranged on the bearing part.

At least one form locking element 280 arranged on the bearing head interacts with this at least one form locking element 270 arranged on the bearing part and is preferably integrally formed into bearing head 32 in the form of a recess which has a cylindrical wall section as a cylindrical form locking section 282 and a conical wall section as a conical form locking section 284 which extends as far as a base 288 of the form locking element 280 arranged on the bearing head so that, proceeding from the base 298, the conical form locking section 284 follows and this is followed, for its part, by the cylindrical form locking section 282 which extends as far as an edge 286 of the recess.

The recess forming the form locking element 280 arranged on the bearing head proceeds from an end face 290 of the bearing head 230 which faces a side 292 of the bearing side wall 14 facing the second bearing side wall 16, wherein the end face 290 and the side 292 of the bearing side wall 14 preferably extend approximately parallel to one another in all the positions of the bearing head 32.

The form locking element 270 arranged on the bearing part is preferably arranged such that the cylindrical form locking section 272 rises above the side 292 of the first bearing side wall 14 while the anchoring section 276 is inserted into a receiving means 294 in the first bearing side wall 14, which is designed as a recess proceeding from the side 292, and is fixed, for example, by additional means, such as, for example, a screw.

In this respect, the anchoring section 276 and the receiving means 294 preferably form a fit for the precise accommodation of the form locking element 270 arranged on the bearing part without any play.

As illustrated in FIG. 7, the form locking element 270 arranged on the bearing part and the form locking element 280 arranged on the bearing head can engage in one another for fixing the bearing head relative to the first bearing side wall 14 of the bearing part 10.

With a complete engagement in one another of the form locking elements 270, 280, the conical form locking sections 274 and 284 abut on one another and when the bearing head 32 is acted upon with a tensioning force 296 in the direction of the first bearing side wall 14, effect a clearance-free fixing of the bearing head 32 relative to the bearing part 10 in relation to any rotation about the bearing axis 20 since areas of the interacting conical form locking sections 274 and 284 which are located opposite one another in azimuthal direction attempt to act in opposite directions of rotation on account of the action of the tensioning force 296 and, therefore, effect a clearance-free tensioning against any play in the direction of rotation.

Furthermore, the cylindrical form locking sections 272 and 282 of the form locking elements 270 and 280, respectively, serve to maintain a form locking connection even when, on account of a large torque acting on the bearing head 32, for example, a torque peak occurring during operation, the conical form locking elements 274 and 284 bring about, on account of their cone angle, a relative movement of the bearing head 32 in the opposite direction to the tensioning force 296 and, therefore, away from the first bearing side wall 14, which could lead to the form locking elements 270 and 280 disengaging from one another.

The cylindrical form locking sections 272 and 282 have an effect when, on account of the cone angle, the conical form locking sections 274 and 284 have moved the bearing head 32 away from the first bearing side wall 14. The cylindrical form locking sections 272 and 282 then have the effect that the form locking elements 270 and 280 are secured relative to one another no longer via the conical form locking sections 274 and 284 but rather only via the cylindrical form locking sections 274 and 284 which, on account of their non-existing cone angle, do not generate even with large forces any force component which could lead to the bearing head 32 moving away from the first bearing side wall 14. Therefore, the cylindrical form locking sections 272 and 282 form a securing means against any disengagement of the form locking elements 270 and 280 during torque loads on the bearing part 32.

In the case of the inventive embodiment, altogether three form locking elements 270A, 270B and 270C arranged on the bearing part are provided around the bearing pin 18; these are arranged at defined angular distances from one another and, as illustrated in FIG. 2, can engage in form locking elements 280AA, 280BA and 280CA arranged on the bearing head which are associated with the operative position A in the operative position A of the ball neck 40 illustrated in FIG. 2.

These form locking elements 280AA to 280CA arranged on the bearing head are only provided for the purpose of forming pairs of form locking elements with the form locking elements 270A to 270C arranged on the bearing part in the operative position A of the ball neck 40.

Figure 10:
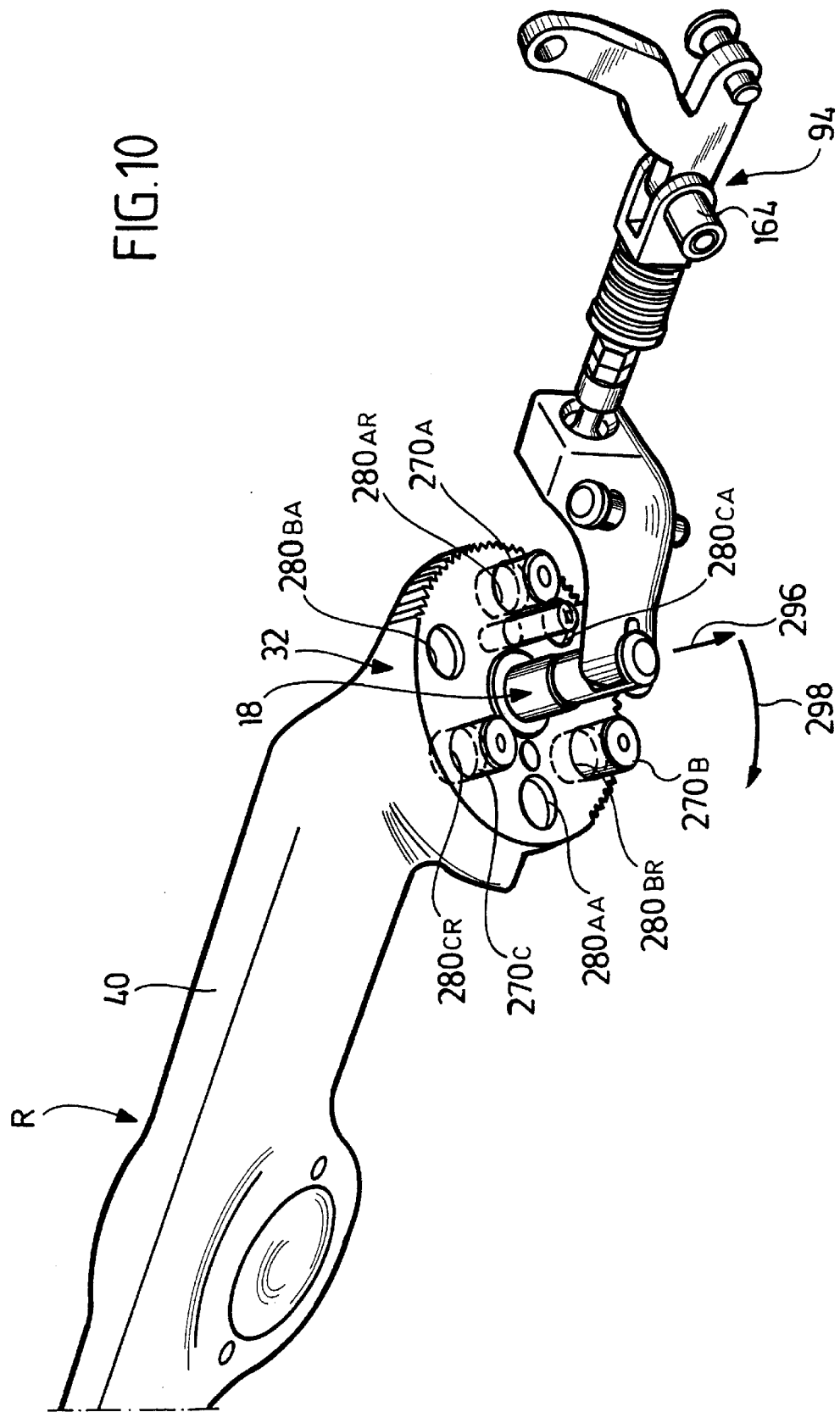
FIG. 10 shows a perspective illustration similar to FIG. 2 with form locking elements in fixing position and ball neck in a rest position.

In order to fix the ball neck 40 in a rest position R, additional form locking elements on the bearing head side are provided on the bearing head 32, namely the form locking elements 280AR, 280BR and 280CR arranged on the bearing head, which form pairs of form locking elements with the form locking elements 270A to 270C in the rest position R, as illustrated in FIG. 10, in order to secure the bearing head 32 in position. As is apparent in FIG. 10, the rest position R of the ball neck 40 can be reached by means of a rotary movement of the bearing head 32 together with the ball neck 40 in a direction 296 through an angle in the order of magnitude of 180°.

As is apparent from FIG. 2 and FIG. 10, the form locking elements 270A, 270B and 270C are in engagement with the form locking elements 280AA, 280BA and 280CA or the form locking elements 280AR, 280BR and 280CR and effect a clearance-free fixing of the bearing head 34 due to action of the tensioning force 296 on the bearing pin 218 when the bearing pin 18 is acted upon accordingly.

The bearing pin 18 is acted upon, on the one hand, by the positioning device 90 represented in FIG. 2 and FIG. 10 by the elbow lever mechanism 94, wherein, in order to contribute to the tensioning force 296, the elbow lever mechanism 94 is in its tensioning position, in which the path follower 164, as illustrated in FIG. 4, is fixed in an over dead center position between the end section 152 of the cam path 154 and the abutment 182. As is already apparent in FIG. 4, the flange 118 is lifted away from the bearing receiving means 110 in this position and so the second lever 100 is shortened in relation to its maximum possible position and, as a result, the cup spring assembly 106 is compressed so that the cup spring assembly 106 is acted upon with a pressure force 300 which contributes to the tensioning force 296 on the bearing pin 18 due to deflection.

In the tensioning position according to FIG. 4, the helical spring 132 only holds the path follower 164 in engagement on the end section 152 of the cam path 142 but does not, itself, contribute to the pressure force 300.

In addition, the displacing wedge 222 with its wedge surface 238 likewise acts, as already explained, on the reversing lever 60 and acts on this with a pressure force 246 which likewise contributes to the tensioning force 296 acting on the bearing pin 18.

As a result, a clearance-free fixing of the bearing head 32 in relation to the first bearing side wall 14 can be realized not only in the operative position A but also in the rest position R by means of the form locking elements 270 and 280, wherein the position of the bearing head 32 and its clearance-free fixing is brought about exclusively by the form locking elements 270 and 280 and, therefore, the bearing head 32 is supported on the bearing part 10 in a positionally defined manner only via the form locking elements 270 and 280 since the end face 290 of the bearing head 32 is at a slight distance from the side 292 of the first bearing side wall 14 facing it.

Preferably, a sufficiently large clearance exists in the area of the bearing pin 18 so that the positional determination in the tensioning position is brought about exclusively by the form locking elements 270 and 280.

In accordance with the invention, forces acting on the ball neck 40 and, therefore, the bearing head 32 and counteracting, for example, the tensioning force 296 are absorbed via the blocking device 220 in this tensioning position, in particular, in the operative position A and conducted directly into the first bearing side wall 14 on the side located opposite the bearing head 32 so that the positioning device 90 merely has the task of contributing to the tensioning force 296 but need not be designed such that it has to be able to absorb forces occurring, for example, on account of operating loads in the operative position A.

In addition, the conical form locking sections 274 and 284 allow, on account of the ever present tensioning force 296, a permanently clearance-free positioning of the bearing head 32 relative to the first bearing side wall 14 also during long operating cycles since the ever present tensioning force 296 always acts in a readjusting manner, also in the case of appearances of wear and tear in the area of the conical form locking sections 274 and 284 and, therefore, in the case of wear and tear, for example, causes the form locking elements 270 arranged on the bearing part to engage even further in the form locking elements 280 arranged on the bearing head.

At the same time, the blocking device 22 also effects, on account of the displacing wedge 222 acted upon by the pressure spring 240, a readjustment of the blocking so that even when wear and tear occurs in the area of the wedge surface 238 or the rear side 236 of the reversing lever 60 the tensioning force 296 is still maintained and the rear side 236 of the reversing lever 60 is tensioned without clearance against the first bearing side wall 14 in order to direct forces counteracting the tensioning force 296 immediately from the reversing lever 60 into the first bearing side wall 14 on the side located opposite the bearing head 32.

As a result, a particularly stable positioning of the bearing head 32 on the first bearing side wall 14 which is resistant to bending and twisting can be realized since the first bearing side wall 14 is clamped so to speak between the blocking device 220 acting on it, on the one hand, and the bearing head 32 acting via the form locking elements 270 and 280, on the other hand, so that essentially pressure forces act on the first bearing side wall 14 in the tensioning position.

Figure 11:
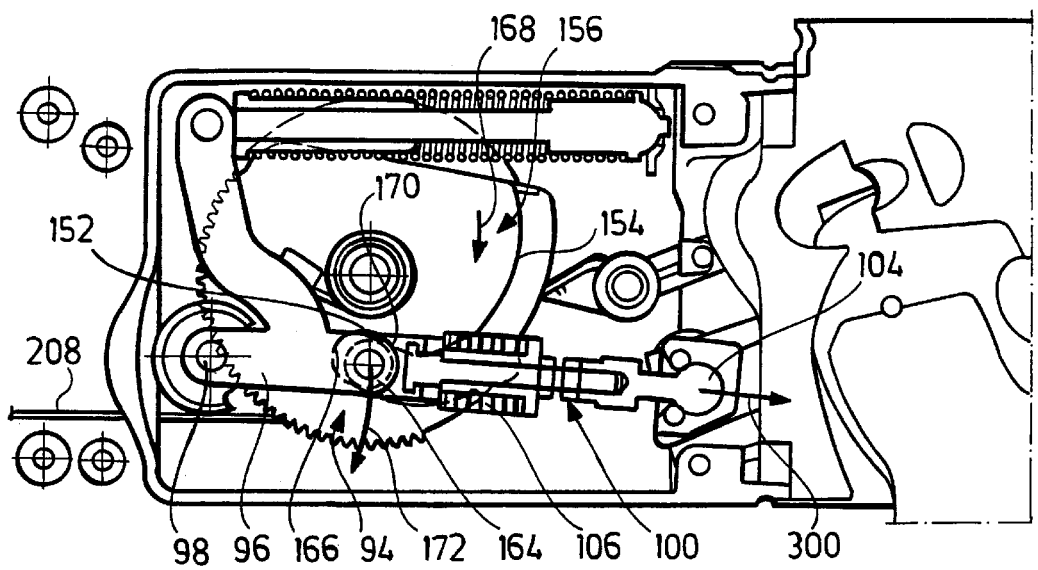
FIG. 11 shows an illustration similar to FIG. 4 with a fixing device moved out of the tensioning position.

A release of the tensioning position illustrated in FIGS. 2, 4 and 7 can be achieved by pulling on the traction cable 208, whereby first of all the drive wheel 190 is turned for such a time until the pin 196 has moved as far as the end 200 of the recess 198. In this position, the regulator wheel 156 is taken along by the drive wheel 190. This taking along now has the effect that, as illustrated in FIG. 11, the cam path 154 is moved and the path follower 164 is no longer acted upon by the end section 152 but rather, for example, by the first cam section 170 which has already caused a movement of the path follower 164 in the direction 172 so that the elbow lever mechanism 94 leaves its end position determined by the end 166 and moves in the direction of the extended position 174 or dead center position. In this respect, a shortening of the second lever 100 occurs and additional compression of the cup spring assembly 106, whereby the pressure on the sphere 104 increases further so that the pressure force 300 also increases and, therefore, the contribution of the positioning device 90 to the tensioning force 296 increases.

Figure 12:
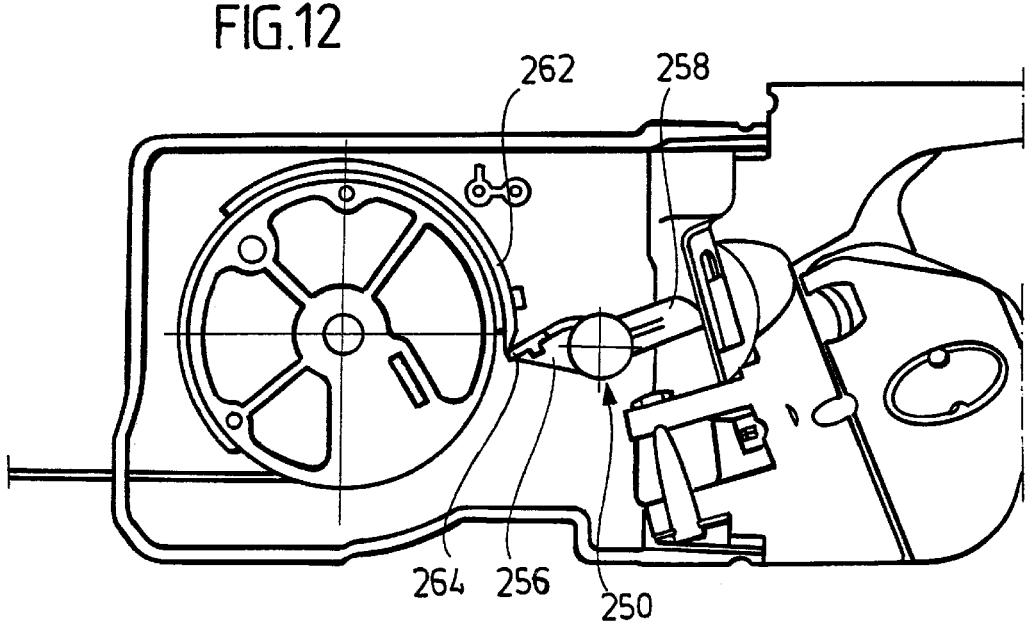
FIG. 12 shows an illustration similar to FIG. 6 with the position of the positioning device illustrated in FIG. 11.
Figure 13:
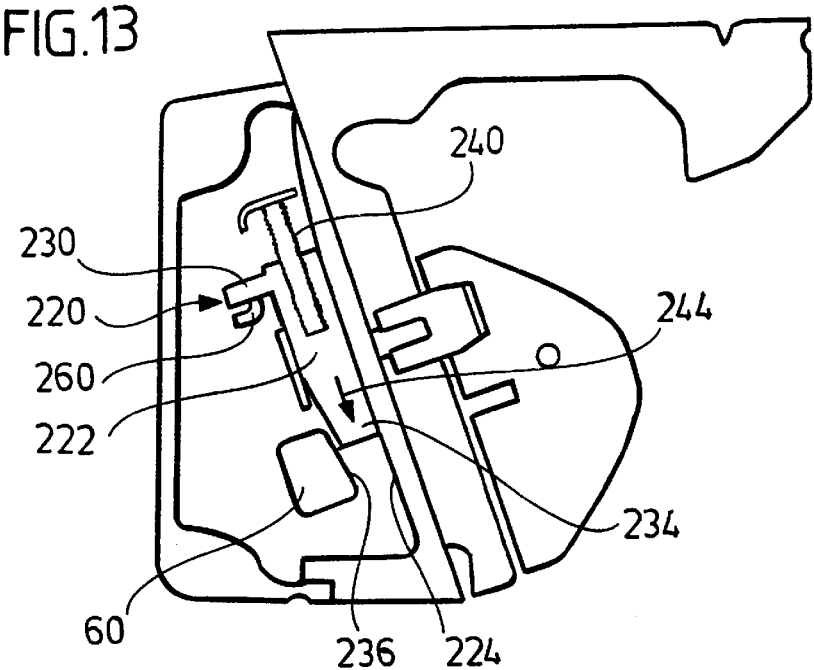
FIG. 13 shows an illustration similar to FIG. 7 with the position of the positioning device illustrated in FIG. 11.

However, a slight rotation of the regulator wheel 156 already causes the actuating cam 262 connected to it to act, as illustrated in FIG. 12, on the end 264 of the actuating rocker 250, whereby the actuating rocker 250 is turned and already acts on the actuating pin 230 of the blocking device 220 with the end area 260 of the arm 258 and already moves the displacing wedge 222 contrary to the pressure force 244 with this slight rotation so that the wedge section 234 begins to migrate out of the space between the rear side 236 of the reversing lever 60 and the slide surface 224 with compression of the pressure spring 240, as illustrated in FIG. 13.

As a result, the pressure force 246 applied by the displacing wedge 222 is discontinued and, therefore, its contribution to the tensioning force 296.

Figure 14:
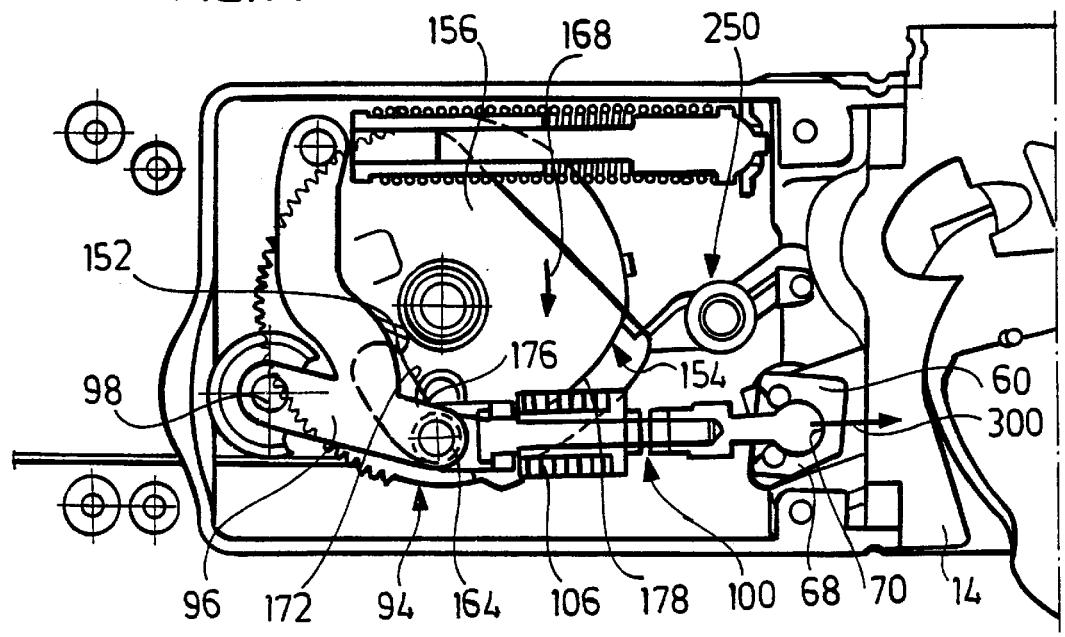
FIG. 14 shows an illustration similar to FIG. 4 with an elbow lever mechanism of the positioning device moved beyond a dead center in a blocking position still present as fixing position.

If the regulator wheel 156 is turned further in the direction 168 by means of the drive wheel 190, this causes first of all, as illustrated in FIG. 14, a continued movement of the cam path 154 in such a manner that the path follower 164 is at the transition between the second cam section 176 and the third cam section 178. In this position, as is apparent in FIG. 14, the pressure force 300 on the reversing lever 60 is approximately zero since the second lever 100 has reached its maximum extension and the cup spring assembly is ineffective. Nevertheless, the reversing lever 60 with its end 68 forming the receiving means 70 is in its position located closest to the first bearing side wall 14 so that, as is apparent in FIG. 16, the bearing head 32 is still close to the first bearing side wall 14 in such a manner that the form locking elements 270 and 280 are in engagement and their conical form locking sections 274 and 284 still abut on one another but—as already explained—there is no tensioning force 296.

This position is still a fixing position since the form locking elements are still completely in engagement and is designated as blocking position.

Figure 15:
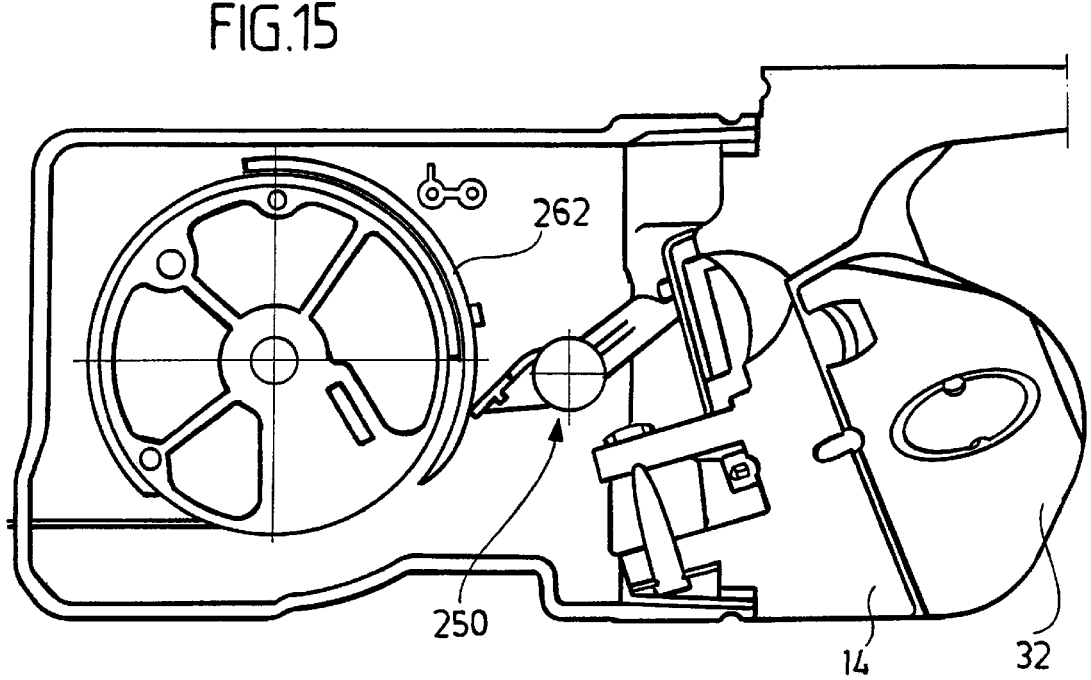
FIG. 15 shows an illustration similar to FIG. 12 with the position of the positioning device illustrated in FIG. 14.
Figure 16:
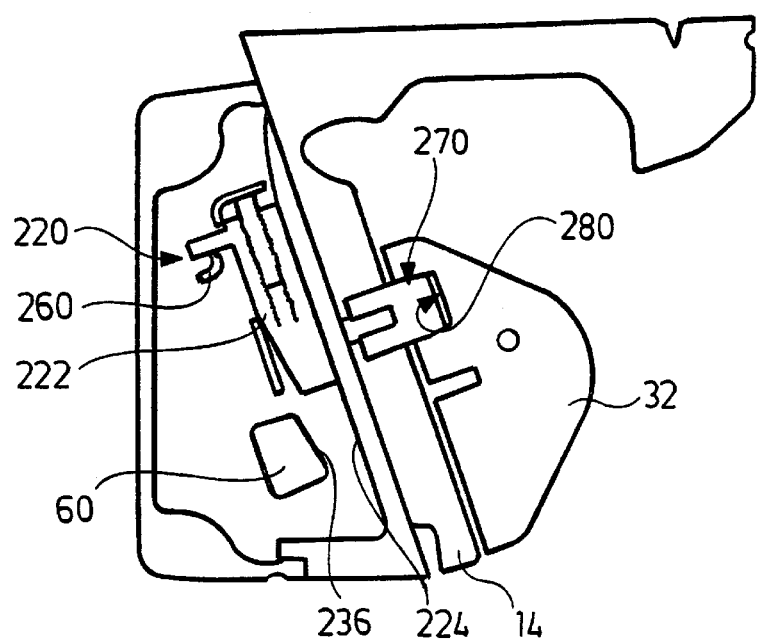
FIG. 16 shows an illustration similar to FIG. 13 with the position of the positioning device illustrated in FIG. 14.

In addition, as illustrated in FIGS. 15 and 16, the actuating rocker 250 is tilted by the actuating cam 262 in the blocking position in such a manner that its end area 260 has drawn the displacing wedge 222 of the blocking device 220 completely out of the space between the rear side 236 of the reversing lever 60 and the slide surface 224 so that the reversing lever 60 can be freely pivoted in the direction of the first bearing side wall 14 with its area located close to the forked part 66.

Figure 17:
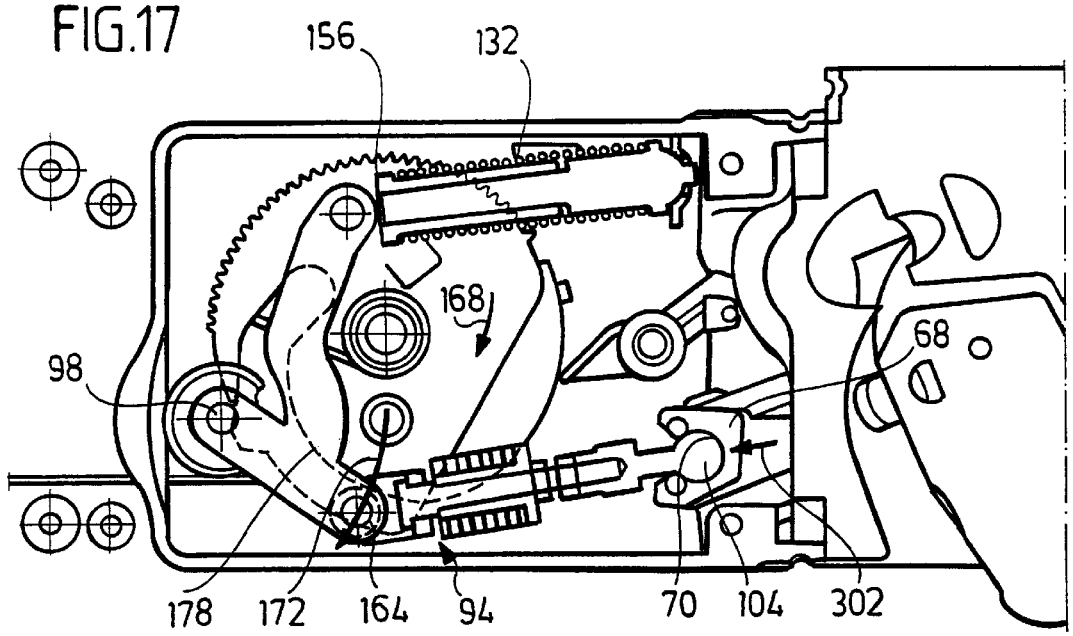
FIG. 17 shows an illustration of the positioning device similar to FIG. 4 in release position.

A pivoting of the reversing lever 60 is brought about during further turning of the regulator wheel 156 in the direction 168, wherein, as illustrated in FIG. 17, the third cam section 178 becomes active and moves the path follower 164 in the direction 172, thereby shortening the distance between the bearing 98 and the sphere 104, so that the elbow lever mechanism 94 acts with a pulling force 302 on the receiving means 70 at the end 68 of the reversing lever 60 and, as a result, displaces the bearing pin 18 in the direction of the second bearing side wall 16, whereby the bearing head 32 moves away from the first bearing side wall 14, as illustrated in FIG. 19, so that the form locking elements 270 and 280 become disengaged. In this position designated as release position, the bearing head 32 is freely rotatable about the bearing pin 18.

Figure 18:
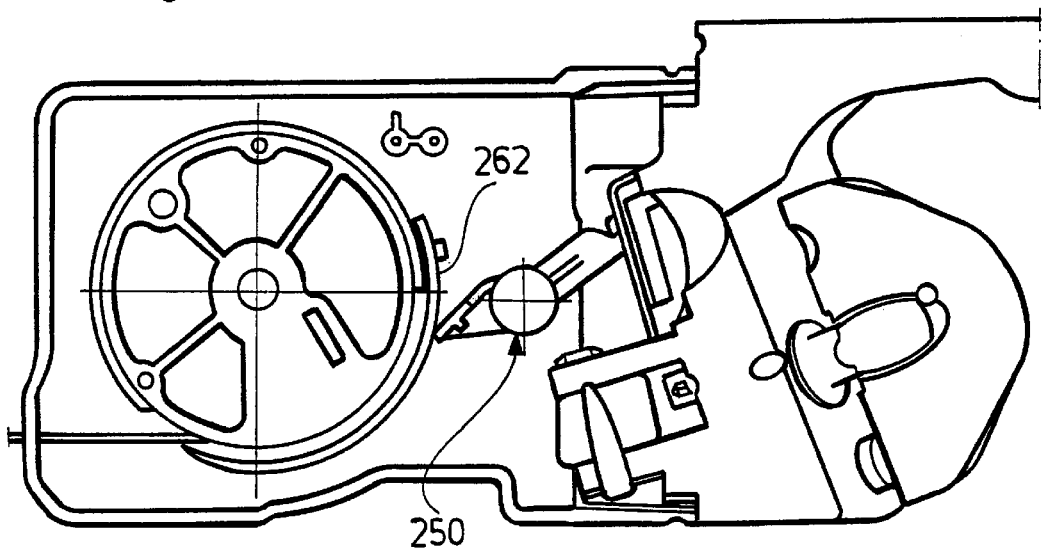
FIG. 18 shows an illustration similar to FIG. 12 with a positioning device in release position according to FIG. 17.

Furthermore, as illustrated in FIGS. 18 and 19, the blocking device 220 is inactive due to the action of the actuating cam 262 on the actuating rocker 250 since the displacing wedge 222 is moved out of the space between the reversing lever 60 and the slide surface 224 and, therefore, the reversing lever 60 can be moved up close to the slide surface 224.

Figure 21:
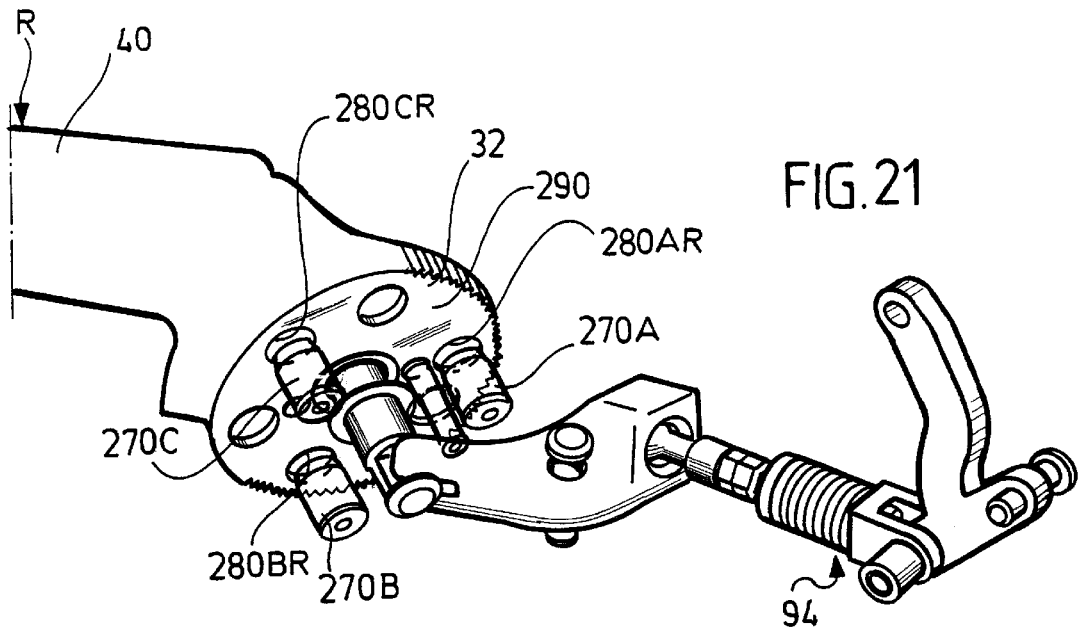
FIG. 21 shows an illustration of bearing head, coupling device and a part of the positioning device with a ball neck in rest position and a positioning device in release position.

This release position can, as illustrated in FIG. 20 and FIG. 21, be reached not only in the operative position A of the ball neck 40 or the rest position R of the ball neck 40, wherein the elbow lever mechanism 94 solely determines the position of the bearing head 32 relative to the form locking elements 270A to 270C arranged on the bearing part and, in particular, keeps the corresponding form locking elements 270, 280 disengaged.

If the pull on the traction cable 208 is terminated in this release position of the elbow lever mechanism 94 with a ball neck 40 located in operative position A or rest position R, the drive wheel 190 turns back into its initial position on account of the action of the torsion spring 192 and the regulator wheel 156 follows immediately afterwards on account of the action of the torsion spring 160 and, consequently, the helical spring 132 moves the elbow lever mechanism 94 back again into its tensioning position, illustrated in FIG. 4, so that the tensioning force 296 is again active in the manner described.

Figure 22:
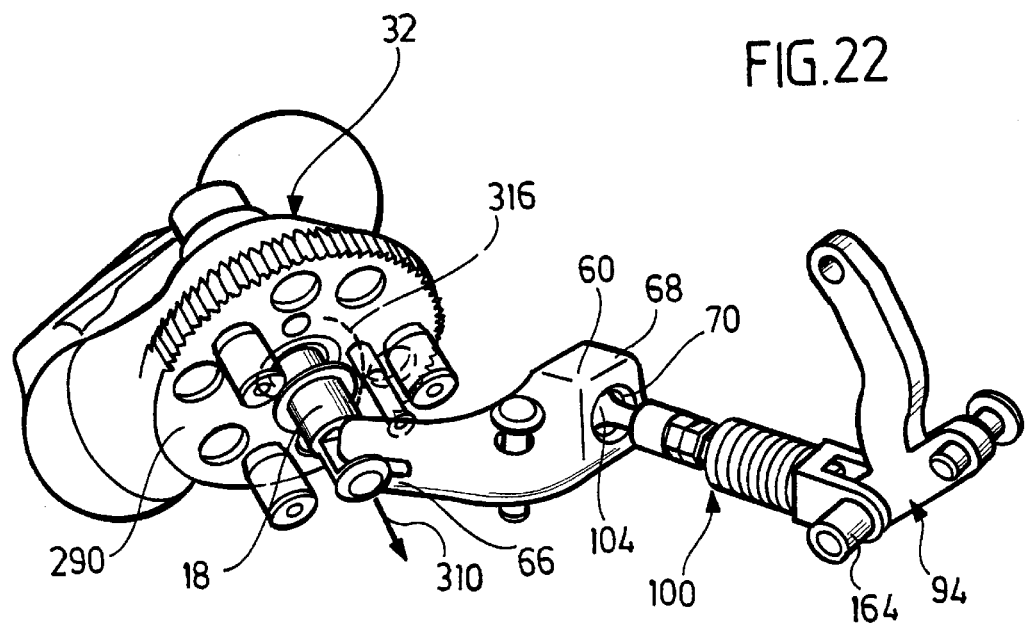
FIG. 22 shows an illustration similar to FIG. 20 or 21 with a ball neck in an intermediate position between the rest position and the operative position and a positioning device in release position.

If, however, in the tensioning position of the elbow lever mechanism 94, as illustrated in FIG. 20 in conjunction with the operative position and in FIG. 21 in conjunction with the rest position, a pivoting of the bearing head 32 is brought about due to pivoting of the ball neck 40 either from the operative position A in the direction of the rest position R or from the rest position R in the direction of the operative position A, the form locking elements 280AA, 280BA and 280CA or the form locking elements 280AR, 280BR and 280CR are no longer located opposite the form locking elements 270A, 270B, as illustrated in FIG. 22.

If the action on the traction cable 208 is terminated in this intermediate position, the drive wheel 190 turns back into its initial position on account of the action of the torsion spring 192, wherein the pin 196 in the recess 198 migrates back in the direction of the beginning 204 while the regulator wheel 156 remains in the release position since the bearing head 32 cannot move in the direction of the first bearing side wall 14. As a result, the bearing pin 18 also remains in this release position and likewise the reversing lever 60, which can be moved in an automatically controlled manner by the bearing pin 18 and, for its part, keeps the elbow lever mechanism 94 in the release position on account of the automatically controlled connection between the coupling device 80 and the positioning device 90, wherein the helical spring 132 is, however, active with a restoring force. A rotation of the bearing head 32 about the axis 20 as pivot axis is now possible for such a time until all the form locking elements 270A, 270B and 270C are again located opposite correspondingly arranged form locking elements 280.

In this respect, the form locking elements 280AA, 280BA and 280CA as well as the form locking elements 280AR, 280BR and 280CR may preferably be arranged at such angular distances that all three form locking elements 270A, 270B and 270C can engage in corresponding form locking elements 280 only in the operative position A or in the rest position R.

In this respect, individual ones of the form locking elements 270A, 270B and 270C cannot, however, be prevented from being located opposite one of the form locking elements 280 during this rotary movement and, therefore, from having the tendency to engage with it since, in the release position, the positioning device 90 acts on the bearing pin 18 with the locking force or restoring force 310 by way of the restoring force applied by the helical spring 132 via the elbow lever mechanism 94 and the reversing lever 60 and this bearing pin 18 acts on the bearing head 32 with the corresponding restoring force 310.

For this reason, as illustrated in FIGS. 20 to 22, the first bearing side wall 214 is provided with a guide member 312 which projects beyond the side 292 of the first bearing side wall 14 facing the bearing head 32 and in the operative position A can dip into a recess 314A making it inactive and in the rest position R into a recess 314R making it inactive.

Between the recesses 314A and 314R, the bearing head 32 has on its end face 290 a supporting path 316, with which the bearing head 32 rests with its end face on the guide member 312 in all the intermediate positions between the operative position A and the rest position R, wherein the guide member 312 is dimensioned in such a manner that the bearing head 32 can turn about the bearing pin 18 without one of the form locking elements 270 dipping even slightly into one of the form locking elements 280.

In this respect, the support surface 316 acts with the restoring force on the guide member 312 such that the interaction thereof keeps not only the bearing head 32 but also the coupling device 80 as well as the positioning device 90 as well as the regulator wheel of the triggering device 150 and, therefore, also the blocking device 220 in the release position.

The restoring force 310 can move the bearing head 32 in the direction of the first bearing side wall 14 only in the operative position A and the rest position R in order to bring the corresponding form locking elements 270 and 280 into engagement, wherein, at the same time, both the coupling device 80 and the positioning device 90 are moved into the tensioning position under the influence of the force of the helical spring 132, wherein the triggering device 150 follows the positioning device 90 into the tensioning position on account of the regulator wheel 156 being acted upon with the torsion spring 160 and the tensioning position of the elbow lever mechanism 94 is fixed, in addition, by the regulator wheel 156.

Furthermore, a tensioning of the cup spring assembly 106, which generates in the tensioning position the pressure force 300 which is part of the tensioning force 296, is also effected by the helical spring 132.

The fact that the tensioning position represents an over dead center position of the elbow lever mechanism 94, which is determined by the cam path 154 and in which the elbow lever mechanism 94 by the force of the helical spring 132 and the action of the force of the cup spring assembly 106, is essential for the locking reliability of the inventive trailer coupling in the tensioning position since this over dead center position of the elbow lever mechanism 94 represents a position which cannot be released per se by acting on the bearing head 32 from the ball neck 40 and via the coupling device 80.

In addition, the abutment 182 of the regulator wheel 156 represents an additional safety function since, in the tensioning position of the regulator wheel 156, the abutment 182 takes away from the path follower 164 the possibility of moving in the direction 172.

A third safety aspect is formed by the blocking device 220 which likewise transfers into the tensioning position with the automatically controlled restoring of the elbow lever mechanism 94 from the release position into the tensioning position on account of the regulator wheel 156 being turned back and the action of the actuating cam 262 on the actuating rocker 250 being discontinued, wherein the pressure spring 240 displaces the displacing wedge 222 to such an extent that the wedge section 234 is again located between the rear side 236 of the reversing lever 60 and the slide surface 224 and not only contributes to the tensioning force 296 on account of the pressure force 246 but, at the same time, represents a blocking for any movement of the rear side 236 of the reversing lever 60 in the direction of the first bearing side wall 14.

The advantage of the inventive solution is therefore to be seen in the fact that when the positioning device 90 is transferred into the release position in an automatically controlled manner and, with it, also the coupling device 80 and the bearing head 32 the restoring force 310 is available when the pull on the traction cable 208 diminishes for such a time until the bearing head 32 and the positioning device 90 have again reached the tensioning position which is secured, in addition, several times.

This takes place automatically in the case of a positioning device 90 which is no longer actuated as soon as the ball neck 40 has reached either the operative position A or the rest position R but not in the intermediate positions between the operative position A and the rest position R so that it is ensured that the ball neck 40 is securely locked only in the positions provided for this, namely the operative position A and the rest position R, but not in any intermediate position and, therefore, a fixing of the ball neck 40 is not possible in any apparently allowable positions.

In the case of the first embodiment of the inventive solution, the ball neck 40 is mounted with the bearing head 32 so as to be freely rotatable on the bearing section 30 of the bearing pin 18.

If a pulling on the traction cable 208 occurs, for example, in the operative position A, the bearing head 32 is transferred into the release position and in this position the ball neck 40 pivots automatically on account of its own weight about the axis 20 of the bearing pin 18 into a position located between the operative position A and the rest position R, for example, a position such as that illustrated in FIG. 22.

In this intermediate position, the guide member 312 with the supporting path 316 prevents any engagement of the form locking elements 270 and 280 and so the operator has the possibility of manually pivoting the ball neck 40 either into the operative position A or into the rest position R, in which an automatic, secure locking then takes place on account of the action of the restoring force 310, wherein the tensioning force 296 is again active in the tensioning position in the manner described.

In the same way, when the traction cable 208 is actuated in the rest position R, the ball neck 40 may also be pivoted out of this rest position on account of its own weight and may be moved from the respective intermediate position either into the rest position R or into the operative position A, in which the secure locking of the bearing head 32 of the ball neck 40 is again brought about automatically.

Figure 23:
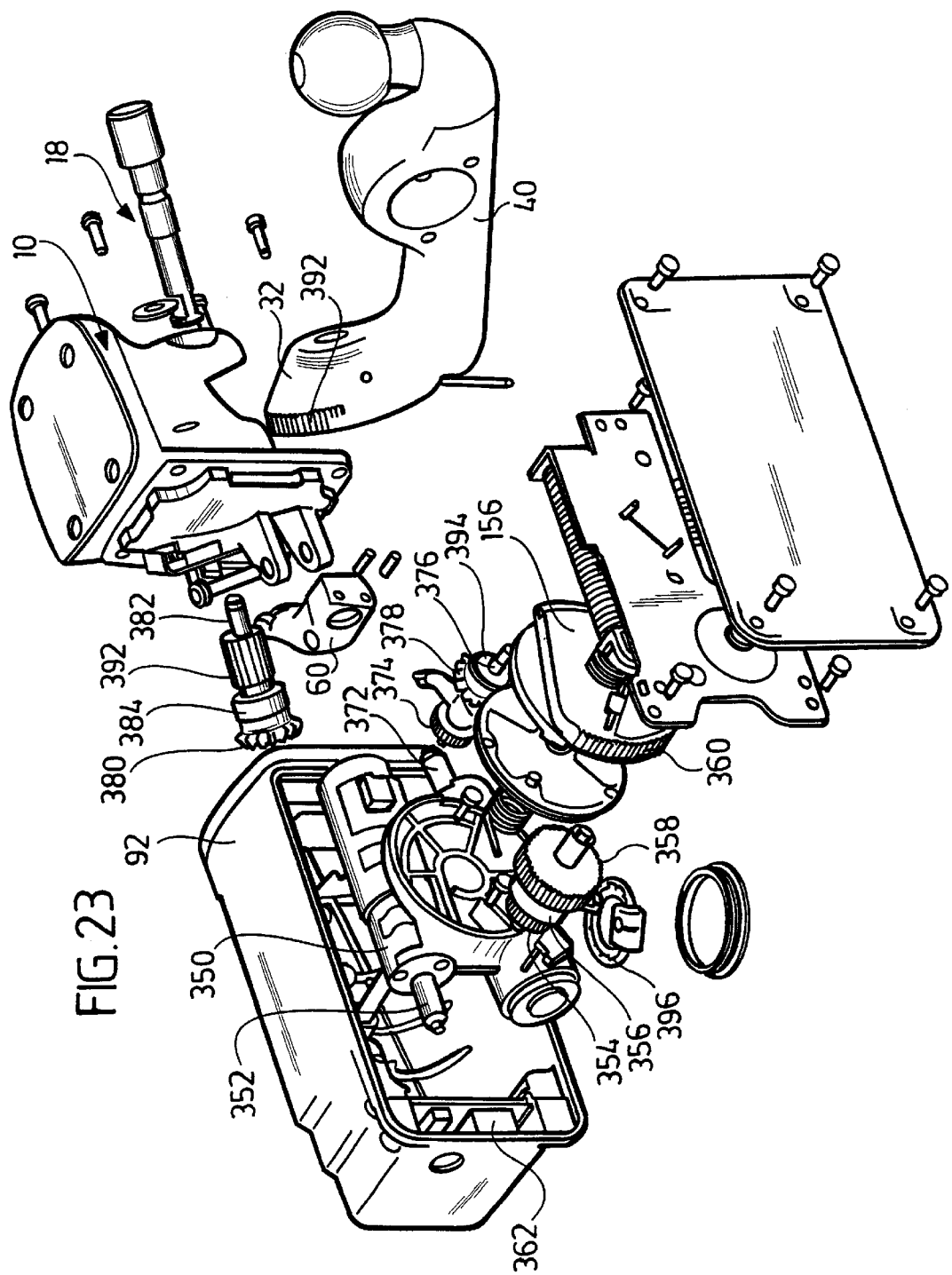
FIG. 23 shows an exploded illustration of a second embodiment of an inventive trailer coupling with an electric triggering drive and electric pivot drive.
Figure 24:
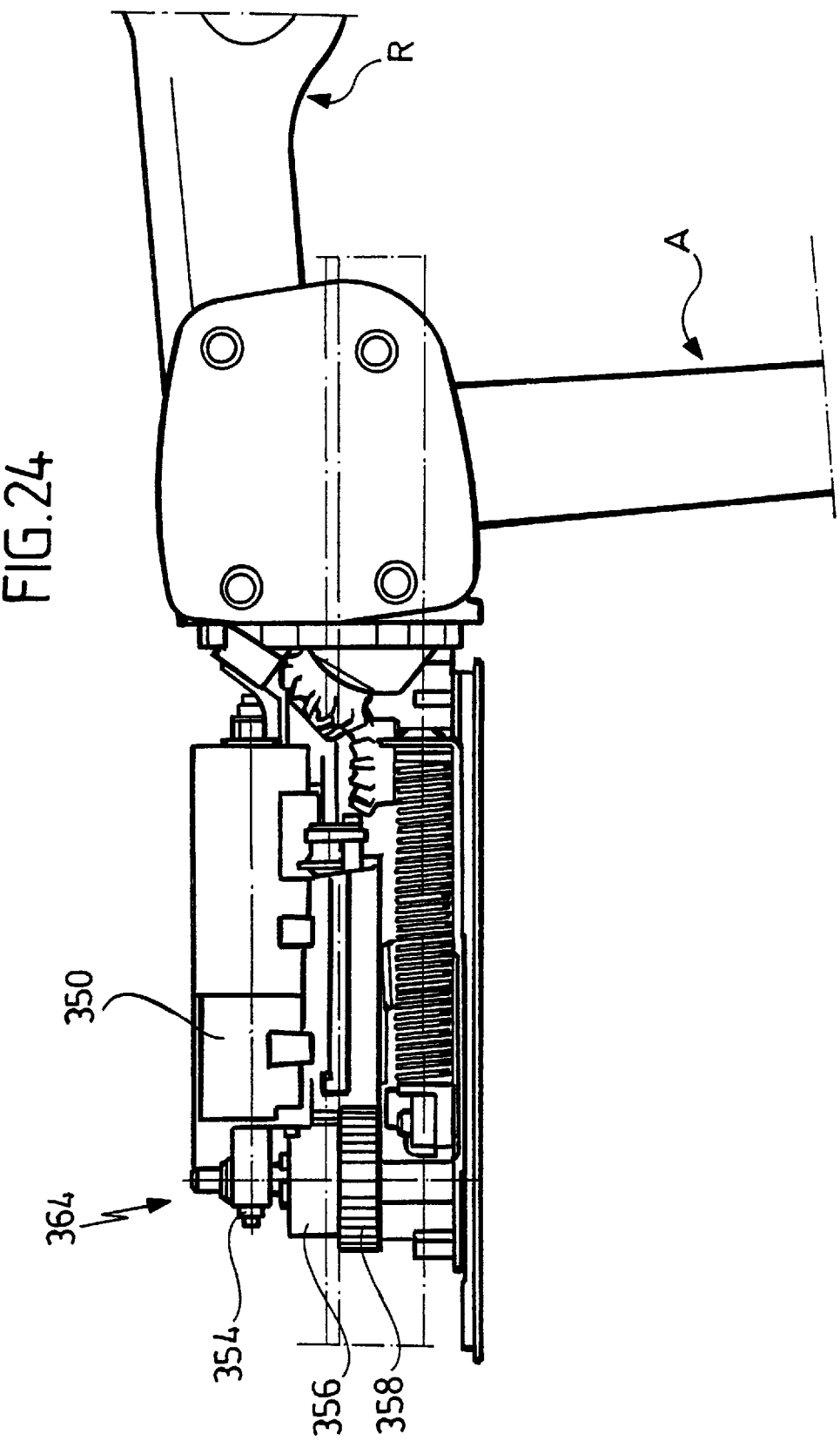

In a second embodiment of an inventive trailer coupling, illustrated in FIGS. 23, 24 and 25, the triggering device 150 can be pivoted by means of an electric triggering drive 364 and, in addition, the ball neck 40 by means of an electric pivot drive 368 from the operative position A into the rest position R and vice versa.

However, it is likewise conceivable to provide only the electric triggering drive 364 for the triggering device 150 without using the electric pivoting drive 368 or only the electric pivoting drive 368 for the pivoting of the ball neck 40 from the operative position A into the rest position R and vice versa, wherein the remaining functions, i.e., the pivoting of the ball neck 40 and the actuating of the triggering device 150 can be carried out manually.

In the second embodiment, all the elements of the first embodiment are used and so with respect to the description thereof reference is made in full to the first embodiment. These elements are, however, supplemented by electric drives.

This type of design of the inventive trailer coupling represents an additional advantage since the mechanical construction is identical and, therefore, different design variations of the trailer coupling can be realized with mechanically identical parts and mechanically identical functions.

As illustrated in FIG. 23 and FIG. 24 for the triggering drive 364, a drive motor 350 is provided which drives an electrically actuatable coupling 356 via a worm 352 and a worm gear 354, the coupling allowing the worm gear 354 to be coupled to a drive pinion 358 in an electrically controlled manner or the coupling to be released, wherein the drive pinion 358 meshes with external teeth 360 of the regulator wheel 156.

In order to transfer the positioning device 90 as well as the bearing head 32 movable in an automatically controlled manner via the coupling device 80 from the tensioning position into the release position, the drive motor 350 is switched on and, at the same time, the electrically controllable coupling 356 is supplied with current in order to provide the operative connection between the worm gear 354 and the drive pinion 358.

As a result, the drive pinion 358 drives the regulator wheel 156 in such a manner that this turns in the direction 168 and, in this respect, transfers the elbow lever mechanism 94 and, therefore, the bearing head 32 from the tensioning position into the release position in the manner described in conjunction with the first embodiment.

A control 362 which activates the drive motor 350 and the electrically activatable coupling 356 is set such that this control 362 switches the drive motor 350 and the electrically controllable coupling 356 off following a period of time which is greater than the period of time normally required for reaching the release position proceeding from the tensioning position, for example, is a multiple thereof for reasons of safety.

In this switched-off state, the drive pinion 358 is freely rotatable relative to the worm gear 354 so that the triggering device 150 is no longer actuated and the restoring force 310 becomes effective in the same way as in the first embodiment in the case of a non-actuated triggering device 150.

As a result, the positioning device 90 and, therefore, the bearing head 32, as well, transfers into the tensioning position—exactly as described in the first embodiment—when the ball neck 40 and the bearing head 32 take up either the operative position A or the rest position R or are located in it.

An element which is advantageous in accordance with the invention is, in this respect, an electrically activatable coupling 356 since this opens up the possibility of releasing the connection between the worm gear 354 and the drive pinion 358 during any type of power outage and, therefore, of keeping the drive pinion 358 freely rotatable so that no more actuation whatsoever of the triggering device 150 takes place via the drive motor 350.

Even when a power outage occurs after the regulator wheel 156 has started to turn, namely between the tensioning position and the release position, the electrically activatable coupling 356 releases the connection of the drive pinion 358 to the worm gear 354 so that the regulator wheel 156 can return to the tensioning position immediately after the release of the electrically activatable coupling 356 on account of the action of the torsion spring 160 and also the helical spring 132.

In this respect, the electrically activatable coupling 356 is preferably a wrap spring coupling or a spring band coupling which merely requires low force in order to be operative.

In this respect, couplings of this type, which can be operated with low force, are, in particular, such couplings which are operative only in one direction of rotation in the coupled state. This is of advantage, in addition, in the case of the inventive solution since, as a result, functional errors due to a polarity inversion of the drive motor 350 and, therefore, an inadmissible reversal of the direction can be precluded.

In addition, the second embodiment comprises for the pivot drive 368, as illustrated in FIGS. 23 and 24, a drive motor 370 which drives, via a worm 372, a worm gear 374 which is seated on a drive shaft 376 which is mounted in the housing 92 and, for its part, bears a first bevel gear 378.

This first bevel gear 378 can drive a second bevel gear 380 which is seated, for its part, as illustrated in FIGS. 23, 24 and 25, on a drive shaft 382 which is mounted in the first bearing side wall 14 via a bearing 384 and in an additional bore 388 in the bearing part with its end 386.

This drive shaft 382 bears, for its part, a pinion 390 which, in every axially displaced position of the bearing head 32, meshes with external teeth 392 thereof so that the bearing head 32 and, therefore, the ball neck 40, as well, is pivotable by means of the drive motor 370.

Furthermore, the first bevel gear 378 is preferably connected via a slip coupling 394, for example, a sliding hub to the drive shaft 382 so that it is possible to pivot the ball neck 40 even when drive motor 370 breaks down by overcoming the triggering moment of the slip coupling 394.

Furthermore, the slip coupling 394 also allows the drive motor 370 for the pivoting of the ball neck 40 to be supplied with current at times when a pivoting of the ball neck 40 is not possible because, for example, the form locking elements 270 and 280 are still not completely released from one another.

Finally, the slip coupling 394 represents an additional safety element which prevents any damage to objects or to persons when they are in the pivoting range of the ball neck 40 during the pivoting thereof and the ball neck 40 runs against them.

A particularly space-saving arrangement of the positioning device 90 and the triggering device 150 can be achieved when the drive motor 350 and the drive motor 370 are located approximately in one plane and the triggering device 150 is arranged approximately parallel to this plane on one side thereof and the positioning device 90 is arranged approximately parallel to it.

All these planes preferably extend vertically but they can also extend in other orientations.

The inventive trailer coupling is, for example, preferably operated by the control 362, which also activates the drive motor 370, in such a manner that in the tensioning position of the positioning device 90, which is either in the operative position A or the rest position R, the drive motor 350 and the electrically controllable coupling 356 are supplied with current first of all so that the drive pinion 358 drives the regulator wheel 356.

The drive motor 370 is started either at the same time or with a delay in time or controlled by a switch detecting, for example, the positions of the regulator wheel 156 and this causes the pivoting movement of the bearing head 32 and, therefore, of the ball neck 40.

If the drive motor 370 is started before the form locking elements 270 and 280 are disengaged, this is not a problem since, in this case, the slip coupling 394 is operative.

As soon as the release position is reached and form locking elements 270 and 280 are disengaged, it is possible to pivot the bearing head 32 about the bearing pin 18.

The control 362 must therefore supply current to the drive motor 350 and the electrically controllable coupling 356 for such a time until it is certain that the release position of the positioning device 90 and, therefore, of the bearing head 32, as well, is reached. As soon as this is reached, the drive motor 370 causes an immediate pivoting of the bearing head 32 so that this immediately leaves the operative position or the rest position and transfers into an intermediate position. As soon as the bearing head 32 is in the intermediate position, the drive motor 350 can be switched off and the electrically controllable coupling 356 is likewise released. The same state is now present when, in the first embodiment, the pull on the traction cable 208 is discontinued.

As soon as the pivoting of the bearing head 32 guides this and the ball neck 40 either into the rest position or into the operative position, the restoring force 310 causes the positioning device to move the bearing head 32 from the release position into the tensioning position again.

It is thus advantageous in the case of the inventive solution that the bearing head 32 transfers automatically, i.e., without any electric drive into a secure position, namely the tensioning position, and is, therefore, duly locked when the operative position or the rest position is reached.

Furthermore, the bearing head 32 also has no possibility whatsoever of transferring, in the intermediate positions, into a position which has the appearance of an orderly locking.

Even in the case of failure of the drive motor 370, the operator still has the possibility of moving the ball neck 40 either into the operative position or into the rest position by overcoming the slip coupling 394.

In addition, it is still possible via the traction cable 208 to actuate the triggering device 150 even with failure of the drive motor 350 and/or the electrically controllable coupling 356 and, as a result, to reach the release position, namely in the same way as that described in the case of the first embodiment, wherein the ball neck 40 can likewise be pivoted between the operative position A and the rest position R by overcoming the triggering force of the slip coupling 394.

The inventive, electrically actuatable coupling according to the second embodiment therefore has the great advantage that it can still be used, even with total failure of the electrics, in the same way as in the first embodiment, i.e., it is possible to transfer and pivot the bearing head 32 from the tensioning position into the release position and, in this respect, to lock it securely again in the operative position or the rest position, respectively, since only mechanically operative and mechanically coupled and interacting devices are operative for the reliable functioning of the locking and no electric drive or electric functional coupling is required.

In addition, a power outage in any intermediate position between the tensioning position and the release position is insignificant during the actuation of the triggering device 150 since a power outage leads immediately to the release of the electrically controllable coupling 356 and, therefore, leads immediately to the free rotatability of the drive pinion 358 and, therefore, to the non-actuated state of the triggering device 150 and, with it, the positioning device 90, as well.

A trailer coupling ring 396 is preferably provided in the second embodiment for the actuation of the traction cable 208 and this is arranged on the housing 92 and, therefore, allows a manual actuation of the triggering device 150.

What is claimed is:

1. A trailer coupling for motor vehicles, comprising:
    a bearing part arranged so as to be fixed on the vehicle,
    a ball neck movable in relation to the bearing part between an operative position and a rest position, said ball neck being mounted on the bearing part by means of a bearing head so as to be at least rotatable,
    a ball neck fixing means comprising first and second form locking elements transferable due to relative movement from a fixing position into a release position,
    the bearing head being secured in a form-locking manner relative to the bearing part in said fixing position, and the bearing head being movable in relation to the bearing part in said release position, and vice versa,
    first form locking elements arranged on the bearing part and second form locking elements arranged on the bearing head,
    the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the positioning device being adapted to be brought into a fixing position, said positioning device positioning the bearing head in said fixing position in such a manner that the form locking elements are in the fixing position, and being adapted to be brought into a release position, said positioning device positioning the bearing head in said release position in such a manner that the form locking elements are in the release position, the positioning device being adapted to be brought by means of an actuation from the fixing position into the release position and the positioning device having a force storing means generating in the release position a restoring force acting in the non-actuated state of the positioning device in the direction of a transfer into the fixing position so that the positioning device transfers the form locking elements in the operative position and the rest position automatically from the release position into the fixing position.

2. A trailer coupling as defined in claim 1, wherein the restoring force of the force storing means is adapted to be activated due to transfer of the positioning device from the fixing position into the release position.

3. A trailer coupling as defined in claim 1, wherein the positioning device moves the bearing head back and forth between the fixing position and the release position in an automatically controlled manner.

4. A trailer coupling as defined in claim 1, wherein the force storing means is a mechanical force storing means.

5. A trailer coupling as defined in claim 4, wherein the force storing means is a spring force storing means.

6. A trailer coupling as defined in claim 1, wherein the force storing means is in a first tensioned state in the fixing position and in a second tensioned state in the release position.

7. A trailer coupling as defined in claim 1, wherein in the non-activated state of the positioning device the mechanism transfers automatically into the stable position due to the action of the force storing means.

8. A trailer coupling as defined in claim 1, wherein the form locking elements on the bearing part are arranged so as to be stationary.

9. A trailer coupling as defined in claim 1, wherein the form locking elements on the bearing head are arranged so as to be stationary.

10. A trailer coupling as defined in claim 1, wherein at least one form locking element of a pair of engaging form locking elements has a surface extending at an angle to a direction of movement of the bearing head, said surface being adapted to abut on the other form locking element of the pair of form locking elements in a tensioning position.

11. A trailer coupling as defined in claim 1, wherein in the operative position the at least one pair of engaging form locking elements is acted upon in the tensioning position with a tensioning force in the direction of movement of the bearing head in order to fix the bearing head on the bearing part free from play.

12. A trailer coupling as defined in claim 1, wherein in the operative position at least two pairs of form locking elements are adapted to be brought into the tensioning position and acted upon with the tensioning force.

13. A trailer coupling as defined in claim 12, wherein in the operative position at least three pairs of form locking elements are adapted to be brought into the tensioning position and acted upon with the tensioning force.

14. A trailer coupling as defined in claim 1, wherein the bearing head is supported on the bearing part essentially via the pairs of form locking elements in the operative position and in the tensioning position of the pairs of form locking elements.

15. A trailer coupling as defined in claim 1, wherein the position of the bearing head is determined relative to the bearing part essentially via the pairs of form locking elements in the operative position and in the tensioning position of the pairs of form locking elements.

16. A trailer coupling for motor vehicles, comprising:
a bearing part arranged so as to be fixed on the vehicle,
a ball neck movable in relation to the bearing part between an operative position and a rest position, said ball neck being mounted on the bearing part by means of a bearing head so as to be at least rotatable,
a ball neck fixing means comprising first and second form locking elements transferable due to relative movement from a fixing position into a release position,
the bearing head being secured in a form-locking manner relative to the bearing part in said fixing position and being movable in relation to the bearing part in said release position, and vice versa,
first form locking elements arranged on the bearing part and second form locking elements arranged on the bearing head,
the bearing head being movable relative to the bearing part in a direction transverse to a pivoting direction in order to move the form locking elements between the fixing position and the release position, and
a mechanical positioning device for bringing about the relative movement of the first and second form locking elements in order to reach the fixing position and the release position,
the positioning device having a mechanism automatically maintaining a stable position of the positioning device in the fixing position.

17. A trailer coupling as defined in claim 16, wherein the mechanism is self-locking in the fixing position against any movement in the direction of the release position.

18. A trailer coupling as defined in claim 16, wherein the mechanism is a lever mechanism.

19. A trailer coupling as defined in claim 16, wherein the mechanism is a force transfer mechanism for the force storing means.

20. A trailer coupling as defined in claim 19, wherein the force transfer mechanism is designed as a force transmission mechanism.

21. A trailer coupling as defined in claim 20, wherein the force transmission mechanism amplifies the force generated in the respective position by the force storing means to a lesser extent in the release position than in the fixing position.

22. A trailer coupling as defined in claim 20, wherein the force transmission mechanism has the greatest amplification for the force of the force storing means in its positions located close to the fixing position.

23. A trailer coupling as defined in claim 19, wherein the force transfer mechanism is an elbow lever mechanism.

24. A trailer coupling as defined in claim 23, wherein the elbow lever mechanism is designed such that it is close to its dead-center position in the fixing position.

25. A trailer coupling for motor vehicles, comprising:
a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the positioning device having a tensioning position as fixing position, the positioning device generating a force contributing to a tensioning force acting on the bearing head in said tensioning position.

26. A trailer coupling as defined in claim 25, wherein the positioning device comprises a tensioning force storing means.

27. A trailer coupling as defined in claim 26, wherein the tensioning force storing means is a mechanical tensioning force storing means, in particular, a spring force storing means.

28. A trailer coupling as defined in claim 26, wherein the tensioning force storing means is adapted to be activated during the transfer of the positioning means into the tensioning position.

29. A trailer coupling as defined in claim 28, wherein the tensioning force storing means is active between the tensioning position and a blocking position of the positioning device.

30. A trailer coupling as defined in claim 28, wherein the tensioning force storing means is inactive between the blocking position and the release position of the positioning device.

31. A trailer coupling as defined in claim 28, wherein the tensioning force storing means is adapted to be activated by the transfer of the positioning device from the blocking position into the tensioning position.

32. A trailer coupling as defined in claim 28, wherein the tensioning force storing means is adapted to be activated by the force storing means.

33. A trailer coupling as defined in claim 25, wherein the tensioning force storing means is integrated into the mechanism of the positioning device.

34. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the positioning device being adapted to be actuated by a triggering device.

35. A trailer coupling as defined in claim 34, wherein with the triggering device the mechanism of the positioning device is movable into the release position contrary to the action of the force storing means.

36. A trailer coupling as defined in claim 34, wherein the triggering device acts on the positioning device with a force amplifying gear.

37. A trailer coupling as defined in claim 34, wherein the triggering device acts on the positioning device with a cam gear.

38. A trailer coupling as defined in claim 34, wherein the self locking of the positioning device is adapted to be terminated with the triggering device.

39. A trailer coupling as defined in claim 34, wherein the positioning device is adapted to be secured in the fixing position with the triggering device.

40. A trailer coupling as defined in claim 34, wherein the triggering device is adapted to be actuated manually.

41. A trailer coupling as defined in claim 40, wherein the triggering device is adapted to be actuated manually via a free-moving element acting on an adjusting element.

42. A trailer coupling as defined in claim 34, wherein the triggering device is adapted to be actuated via an electric triggering drive.

43. A trailer coupling as defined in claim 42, wherein the electric triggering drive comprises a drive motor and an electrically controllable coupling.

44. A trailer coupling as defined in claim 43, wherein the electrically controllable coupling is designed as a coupling released in the state without current.

45. A trailer coupling as defined in claim 43, wherein the electric triggering drive has a triggering control closing the electrically controllable coupling during a predetermined triggering period following a starting signal and subsequently releasing it.

46. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the positioning device acting on the bearing head via a coupling device.

47. A trailer coupling as defined in claim 46, wherein the coupling device comprises a movable bearing pin, the bearing head being rotatably mounted on said pin and the bearing head being movable via said pin from the fixing position into the release position and vice versa.

48. A trailer coupling as defined in claim 47, wherein the bearing head is movable by means of the movable bearing pin in the direction of a first bearing side wall of the bearing part bearing form locking elements arranged on the bearing part.

49. A trailer coupling as defined in claim 48, wherein the bearing pin is mounted in the first bearing side wall and a second bearing side wall of the bearing part arranged at a distance from said first bearing side wall and wherein the bearing head of the bearing neck is arranged between the bearing side walls.

50. A trailer coupling as defined in claim 47, wherein the bearing pin is acted upon from a side of a bearing side wall facing away from the bearing head.

51. A trailer coupling as defined in claim 47, wherein the coupling device comprises a reversing lever coupled to the bearing pin.

52. A trailer coupling as defined in claim 51, wherein the reversing lever is arranged on a side of one of the bearing side walls located opposite the bearing head.

53. A trailer coupling as defined in claim 47, wherein the bearing head is arranged on the bearing pin so as to be freely rotatable.

54. A trailer coupling as defined in claim 53, wherein the ball neck is adapted to be pivoted manually relative to the bearing part.

55. A trailer coupling as defined in claim 46, wherein an electrically controllable pivot drive is provided for the ball neck.

56. A trailer coupling as defined in claim 55, wherein the pivot drive has an electric drive motor.

57. A trailer coupling as defined in claim 55, wherein the pivot drive comprises a releasable coupling allowing a manual pivoting of the ball neck upon failure of the pivot drive.

58. A trailer coupling as defined in claim 57, wherein the releasable coupling is a slip coupling.

59. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the bearing head being adapted to be blocked by a blocking device against any movement from the fixing position in the direction of the release position.

60. A trailer coupling as defined in claim 59, wherein the blocking device is supported on the bearing part.

61. A trailer coupling as defined in claim 60, wherein the blocking device is supported on the bearing side wall of the bearing part bearing the form locking elements arranged on the bearing part.

62. A trailer coupling as defined in claim 59, wherein the blocking means is adapted to be actuated by the triggering device.

63. A trailer coupling as defined in claim 62, wherein the blocking device is adapted to be actuated with the triggering device in a defined synchronization in relation to the positioning device.

64. A trailer coupling as defined in claim 62, wherein the triggering device terminates the effect of the blocking device during the transfer from the fixing position into the release position before the positioning device begins to bring the form locking elements out of engagement.

65. A trailer coupling as defined in claim 62, wherein during the transfer from the release position into the fixing position the triggering device first causes the positioning device to bring the form locking elements into engagement and then causes the blocking device to become active.

66. A trailer coupling as defined in claim 59, wherein the blocking device is designed to be self-readjusting.

67. A trailer coupling as defined in claim 59, wherein the blocking device acts on the bearing head in its active position with a force contributing to the tensioning force.

68. A trailer coupling as defined in claim 59, wherein the blocking device acts on the coupling device.

69. A trailer coupling as defined in claim 59, wherein the blocking device is arranged on a side of a bearing side wall of the bearing part facing away from the bearing head.

70. A trailer coupling as defined in claim 68, wherein the blocking device has a blocking member interacting with the coupling device and the bearing part.

71. A trailer coupling as defined in claim 69, wherein the blocking member is supported on the bearing side wall of the bearing part on a side facing away from the form locking elements arranged on the bearing part.

72. A trailer coupling as defined in claim 59, wherein the blocking device and the positioning device are arranged on the same side of the bearing part.

73. A trailer coupling as defined in claim 59, wherein the blocking device and the triggering device are arranged on the same side of the bearing part.

74. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the bearing head having a bearing bore extending at an angle to the horizontal in the state mounted on the vehicle and the form locking elements being arranged on the side of the bearing head where the bearing bore extends closer to the roadway than on the other side.

75. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, a bearing bolt extending at an angle to the horizontal and the form locking elements being arranged on the side of the bearing part accommodating the end area of a bearing pin located closest to the roadway.

76. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, in an operative position one part of the form locking elements located in fixing position being in engagement.

77. A trailer coupling as defined in claim 76, wherein:

at least one first form locking element is arranged on the bearing part or on the bearing head, said element being in engagement with a form locking element on the respectively other part only in the operative position, and at least one other form locking element is arranged on the bearing part or on the bearing head, said element being in engagement with a form locking element on the respectively other part only in the rest position.

78. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, in the rest position one part of the form locking elements located in fixing position being in engagement.

79. A trailer coupling for motor vehicles, comprising:

a bearing part arranged so as to be fixed on the vehicle, a ball neck movable in relation to the bearing part between an operative position and a rest position, said ball neck being mounted on the bearing part by means of a bearing head so as to be at least rotatable, a ball neck fixing means comprising first and second form locking elements transferable due to relative movement from a fixing position into a release position, the bearing head being secured in a form-locking manner relative to the bearing part in said fixing position and being movable in relation to the bearing part in said release position, and vice versa, first form locking elements arranged on the bearing part and second form locking elements arranged on the bearing head, the bearing head being movable relative to the bearing part in a direction transverse to a pivoting direction in order to move the form locking elements between the fixing position and the release position, and a mechanical positioning device for bringing about the relative movement of the first and second form locking elements in order to reach the fixing position and the release position, the ball neck fixing means being designed such that the form locking elements are adapted to be brought into engagement in a form-locking manner only in the operative position and the rest position.

80. A trailer coupling as defined in claim 79, wherein the ball neck fixing means comprises guide elements preventing any engagement of the form locking elements in intermediate positions between the operative position and the rest position.

* * * * *